(12) United States Patent
Chavez et al.

(10) Patent No.: US 10,739,761 B2
(45) Date of Patent: Aug. 11, 2020

(54) SCALABLE EDGE COMPUTE IN A DISTRIBUTED CONTROL ENVIRONMENT

(71) Applicant: Intel Corporation, Santa Clara, CA (US)

(72) Inventors: Robert Chavez, Phoenix, AZ (US); Rita H. Wouhaybi, Portland, OR (US); Mark Yarvis, Portland, OR (US); Kirk Smith, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 16/147,148

(22) Filed: Sep. 28, 2018

(65) Prior Publication Data

US 2019/0041824 A1 Feb. 7, 2019

Related U.S. Application Data

(60) Provisional application No. 62/587,227, filed on Nov. 16, 2017, provisional application No. 62/612,092, filed on Dec. 29, 2017.

(51) Int. Cl.
*G06F 1/00* (2006.01)
*G05B 19/418* (2006.01)
(Continued)

(52) U.S. Cl.
CPC ..... *G05B 19/41835* (2013.01); *G05B 19/042* (2013.01); *G05B 19/054* (2013.01); *G06F 11/2023* (2013.01); *H04L 41/0668* (2013.01); *H04L 41/082* (2013.01); *H04L 41/0846* (2013.01); *H04L 67/04* (2013.01); *H04L 67/10* (2013.01); *H04L 67/1048* (2013.01); *H04L 67/1051* (2013.01); *H04L 67/12* (2013.01); *H04L 67/125* (2013.01); *H04L 67/2823* (2013.01); *H04L 67/34* (2013.01);
(Continued)

(58) Field of Classification Search
CPC ................................................ G05B 19/41835
See application file for complete search history.

(56) References Cited

U.S. PATENT DOCUMENTS 9,774,658 B2 * 9/2017 Borzycki ................ H04L 67/10
2010/0153736 A1 6/2010 Kilian
(Continued)

FOREIGN PATENT DOCUMENTS

WO  WO-2018144059 A1  8/2018

OTHER PUBLICATIONS

"International Application No. PCT US2018 053607, Invitation to Pay Additional fees dated Jan. 16, 2019", 15 pgs.
(Continued)

*Primary Examiner* — Mohammed H Rehman
(74) *Attorney, Agent, or Firm* — Schwegman Lundberg & Woessner, P.A.

(57) ABSTRACT

Various systems and methods may be used to implement a software defined industrial system. For example, an edge control node of the industrial system may include a system on a chip including a microcontroller (MCU) to convert IO data. The system on a chip includes a central processing unit (CPU) in an initial inactive state to receive an activation signal from, for example, an orchestration server, and change to an activated state in response to receiving the activation signal.

22 Claims, 20 Drawing Sheets

(51) Int. Cl.
  *H04L 29/08* (2006.01)
  *G05B 19/042* (2006.01)
  *H04L 12/24* (2006.01)
  *H04L 29/14* (2006.01)
  *G06F 11/20* (2006.01)
  *G05B 19/05* (2006.01)
(52) U.S. Cl.
  CPC ...... *H04L 69/40* (2013.01); *G05B 2219/1105* (2013.01); *G05B 2219/1214* (2013.01); *G05B 2219/33112* (2013.01); *G06F 2201/805* (2013.01); *G06F 2201/82* (2013.01)

(56) References Cited

U.S. PATENT DOCUMENTS

| | | | |
|---|---|---|---|
| 2014/0146673 A1* | 5/2014 | Parker | H04L 47/10 370/235 |
| 2016/0337403 A1* | 11/2016 | Stoops | H04W 12/06 |
| 2017/0093587 A1* | 3/2017 | Glisson | H04L 9/3268 |
| 2018/0084111 A1* | 3/2018 | Pirat | H04M 3/5166 |
| 2019/0041830 A1 | 2/2019 | Yarvis et al. | |
| 2019/0042378 A1 | 2/2019 | Wouhaybi et al. | |

OTHER PUBLICATIONS

"International Application Serial No. PCT US2018 053607, International Search Report dated Mar. 13, 2019", 6 pgs.
"International Application Serial No. PCT US2018 053607, Written Opinion dated Mar. 13, 2019", 10 pgs.
Hu, Yun Chao, et al., "Mobile Edge Computing a key technology towards 5G", ETSI White Paper No. 11, (Sep. 2015), 16 pgs.
U.S. Appl. No. 16/147,190, filed Sep. 28, 2018, Self-Descriptive Orchestratable Modules in Software-Defined Industrial Systems.
U.S. Appl. No. 16/147,168, filed Sep. 28, 2018, Distributed Dynamic Architecture for Error Correction.

* cited by examiner

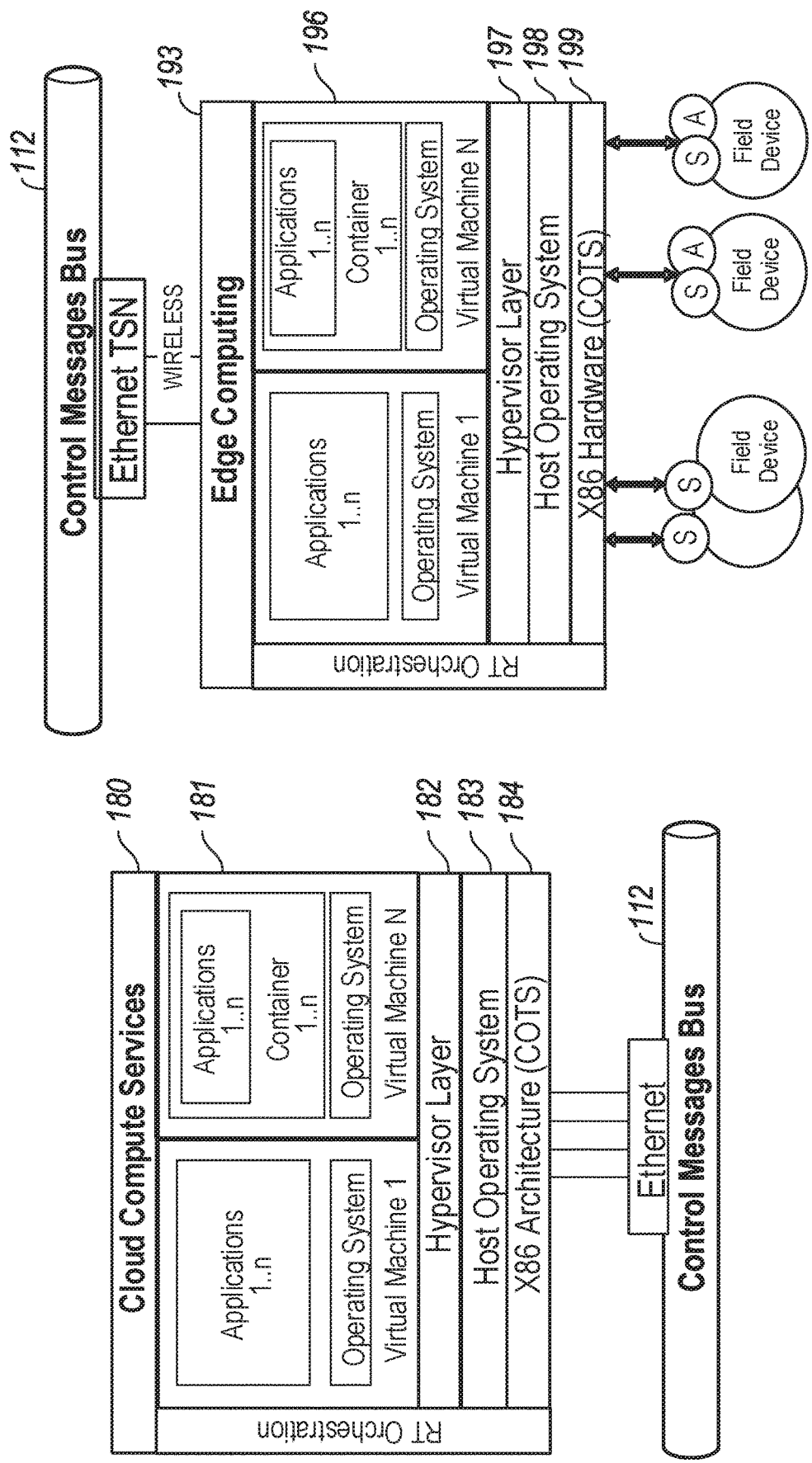

SCALABLE EDGE COMPUTE IN A DISTRIBUTED CONTROL ENVIRONMENT

PRIORITY CLAIM

This application claims the benefit of priority to U.S. Provisional Patent Application Ser. Nos. 62/587,227, filed Nov. 16, 2017 and titled "DISTRIBUTED SOFTWARE DEFINED INDUSTRIAL SYSTEMS", and 62/612,092, filed Dec. 29, 2017, and titled "DISTRIBUTED SOFTWARE DEFINED INDUSTRIAL SYSTEMS"; the above-identified provisional applications are incorporated herein by reference in their entirety.

TECHNICAL FIELD

Embodiments described herein generally relate to data processing and communications within distributed and interconnected device networks, and in particular, to techniques for defining operations of a software-defined industrial system (SDIS) provided from configurable Internet-of-Things devices and device networks.

BACKGROUND

Industrial systems are designed to capture real-world instrumentation (e.g., sensor) data and actuate responses in real time, while operating reliably and safely. The physical environment for use of such industrial systems may be harsh, and encounter wide variations in temperature, vibration, and moisture. Small changes to system design may be difficult to implement, as many statically configured I/O and subsystems lack the flexibility to be updated within an industrial system without a full unit shutdown. Over time, the incremental changes required to properly operate an industrial system may become overly complex and result in significant management complexity. Additionally, many industrial control systems encounter costly operational and capital expenses, and many control systems are not architecturally structured to take advantage of the latest information technology advancements.

The development of Internet of Things (IoT) technology along with software-defined technologies (such as virtualization) has led to technical advances in many forms of telecom, enterprise and cloud systems. Technical advances in real-time virtualization, high availability, security, software-defined systems, and networking have provided improvements in such systems. However, IoT devices may be physically heterogeneous and their software may also be heterogeneous (or may grow increasingly heterogeneous over time), making such devices complex to manage.

Limited approaches have been investigated to utilize IoT devices and IoT frameworks even despite the technical advances that have occurred in industrial automation and systems. Further, industry has been hesitant to adopt new technologies in industrial systems and automation, because of the high cost and unproven reliability of new technology. This reluctance means that typically, only incremental changes are attempted; and even then, there are numerous examples of new technology that underperformed or took long periods of time to bring online. As a result, wide-scale deployment of IoT technology and software-defined technologies has not been successfully adapted to industrial settings.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 3B and 3C illustrates a configuration of cloud computing and edge computing subsystems deployable within the SDIS operational architecture of FIG. 1B, according to an example;

DETAILED DESCRIPTION

Figure 1A:
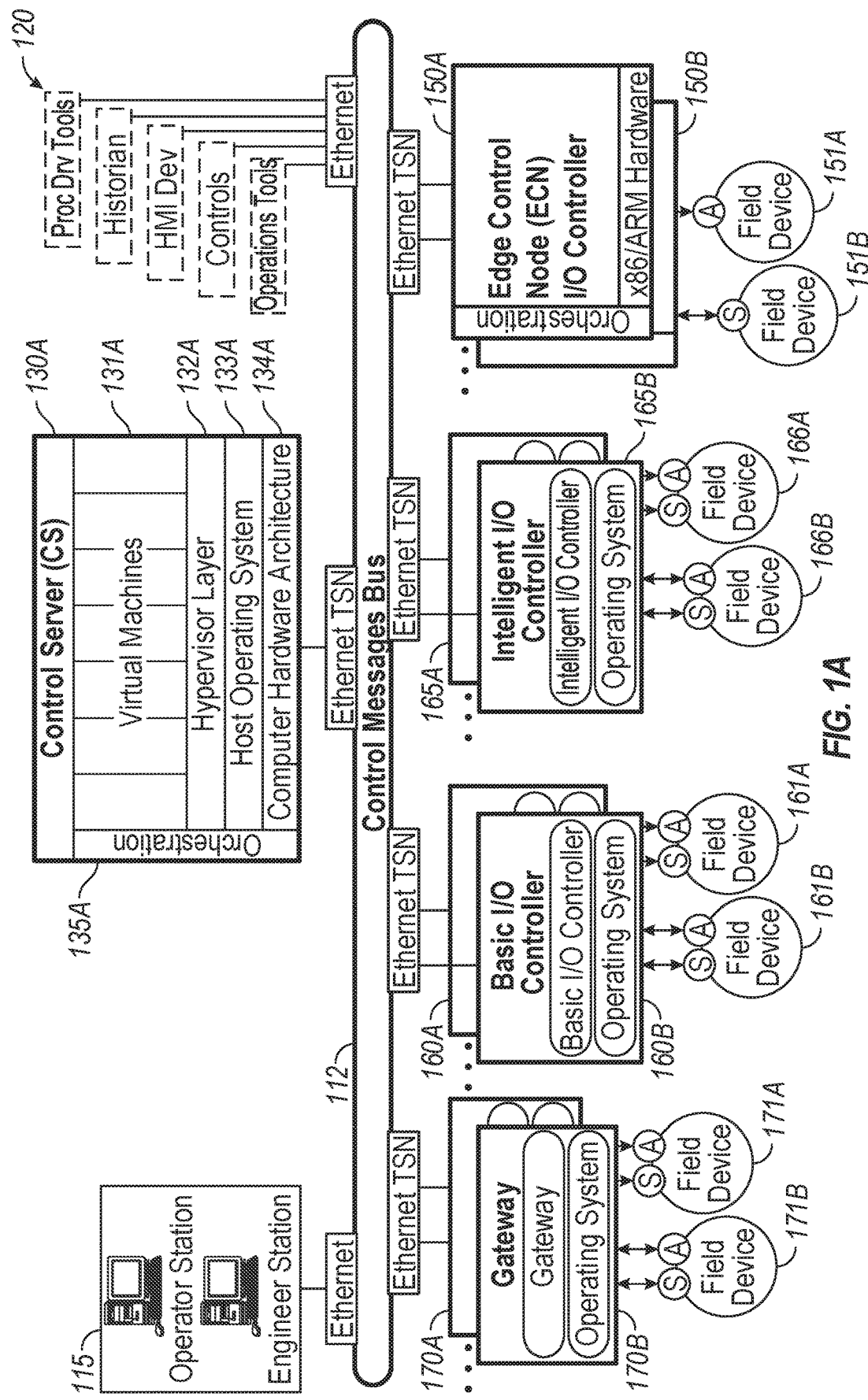
FIG. 1A illustrates a configuration of a software defined infrastructure (SDIS) operational architecture, according to a first example.

In the following description, methods, configurations, and related apparatuses are disclosed for the configuration, operation, and adaptation of software-defined industrial service (SDIS) deployments. In particular, the following SDIS deployments include features of modern operational architecture-based industrial systems, along with derivative architectures or solution instances of such deployments. For instance, such architectures and instances may include virtualized control server systems, which implement features of an edge control device and a control messages bus within a control or monitoring system. Such architecture and instances may be further integrated with aspects of IoT networks, involving various forms of IoT devices and operations.

The processing techniques and configurations discussed herein include a variety of approaches for managing operations, data, and processing within various types of SDIS architectures. An overview of the following approaches are provided in the following paragraphs; further reference to specific implementation examples and use cases is discussed below.

In an example, the systems and methods described herein address the problem of over or under provisioning the compute capability at the edge of an industrial control system. Over provisioning the compute resources wastes money, electrical energy, and thermal energy. Under provisioning the compute resources sacrifices reliability, and the ability to execute the control strategy. The proposed solution enables the end user with the performance requirement data to "right" size the amount of compute provisioned in the control environment. Additionally, the provisioned compute capability is not static and may be adapted to meet the needs of the control system as the requirements change. The techniques discussed herein allow a high performance CPU to be activated, from an initial dormant state, in the Edge Control Nodes by a centralized orchestration system that understands the CPU performance needs of the control strategy.

Other examples will be apparent from the following drawings and text disclosure.

Overview of Industrial Automation Systems

Designing and implementing effective industrial automation systems presents many technical challenges. Because the lifecycle of an industrial plant in many cases far exceeds the lifecycle of the technology that runs the plant, the administration and maintenance costs of technology are often very difficult to manage. In an example, a SDIS deployment may be adapted for dynamic configuration (and re-configuration) of software and hardware resources in industrial systems through resource abstraction with the following approaches. Such resource abstraction provides flexibility for updating the configuration without removing the industrial system out of service; such resource abstraction also provides flexibility for updating the industrial system with improved capabilities over time.

Use of open architectures and abstracted links between software and hardware in the presently disclosed SDIS approaches provides these and other technical benefits, while allowing vendors to focus on the capabilities and implementation of a specific vendor application. The disclosed open architectures also promote innovation, reduce the cost of hardware replacement, and eliminate the risk of hardware obsolescence. The disclosed open architectures enable security to be implemented as an intrinsic part of the SDIS, such as through the use of a hardware root of trust, signed applications, and comprehensive security management. Such configurations enable a simplified control system with inherent security and the capability to easily integrate capabilities over time. These technical improvements, combined with features of open architecture and standards implementations, enable the rapid integration of industrial control within an SDIS.

Some existing approaches such as the Open Group's Open Process Automation Forum have begun development of a standards-based, open, interoperable process control architecture features for industrial automation, targeting industries such as Food and Beverage, Mining and Metals, Oil and Gas, Petrochemical, Pharmaceutical, Pulp and Paper, and Utilities. The present configuration and functionality of a SDIS and the accompanying subsystems and techniques may be integrated with use of this standard or similar approaches within industrial automation and system deployment efforts. Further, the present configuration and functionality of a SDIS and the accompanying subsystems may be utilized in these or other industries. Accordingly, variations and changes to the following implementations will be evident.

FIG. 1A depicts a first example configuration of an SDIS operational architecture. As shown, a control messages bus 112 is used to connect various components of the architecture, with such components including Operational Tools 120, a Control Server (CS) node 130A, Edge Control Node (ECN) systems 150, Intelligent I/O Controller systems 165, Basic I/O Controller systems 160, Gateway systems 170, and Control Stations 115. Various field devices (151, 161, 166, 171) are connected to the respective systems (150, 160, 165, 170). Some of the example use cases and configurations of this operational architecture are further discussed below.

In an example, the Operational Tools 120 may include aspects of: procedure development tools, historian tools, human-machine interface (HMI) development, controls, and operations tools. Various aspects of the Operational Tools 120 may be implemented with respective virtual machines 131A operating in the control server node 130A (as further depicted in FIG. 2A).

In an example, the control server node 130A may include aspects of various virtual machines 131A, coordinated via a hypervisor layer 132A, and operating with features of a host operating system 133A and a computer hardware architecture 134A. The control server node 130A may be used to implement various aspects of orchestration 135A, involving both machine orchestration and operational application orchestration. A further detailed discussion of the control server node 130A is provided below with reference to FIG. 2A below.

In an example, the ECN systems 150 may include various aspects of orchestration (e.g., orchestration implementation) from an ECN I/O controller (e.g., nodes 150A, 150B) operating on specific hardware (e.g., an x86 or ARM hardware implementation). A further detailed example of the ECN systems 150 and its role in orchestration for various connected devices (e.g., field devices 151A, 151B) is provided below with reference to FIG. 2B.

In an example, the Intelligent I/O systems 165 may include various configurable aspects of industrial control from an Intelligent I/O controller (e.g., controller 165A, 165B) and an accompanying operating system, used for control or access of various devices (e.g., field devices 166A, 166B). Also in an example, the Basic I/O systems 160 may include various operating aspects of industrial control from a Basic I/O controller (e.g., controller 160A, 160B) and an accompanying operating system, used for control or access of various devices (e.g., field devices 161A, 161B).

In an example, the Gateway systems 170 may include various configurable aspects for connection to other device networks or deployments, from a gateway (e.g., gateways 170A, 170B), used for control or access of various devices (e.g., field devices 171A, 171B). Within the various devices, roles of a sensor ("S") and actuator ("A") components are labeled throughout the field devices (e.g., on field devices 151A, 151B, 161A, 161B, 166A, 166B, 171A, 171B). It will be understood that additional number and types of devices and components may also be coupled to the various systems 150, 160, 165, 170.

The operational architecture depicted in FIG. 1A is configured to enable many of the same attributes seen in traditional enterprise architectures, such as HW/SW modularity, SW portability, interoperability, application extensibility and computational scalability. Beyond this, the new infrastructure framework components introduced in this architecture, most notably in the implementation of CS and ECN systems, may be deployed to support both centralized and decentralized concepts for the SDIS techniques discussed herein.

For example, the use of an ECN I/O Controller (e.g., in ECN nodes 150A, 150B) is a significant architecture departure from current DCS (Distributed Control System) and PLC (programmable logic controller) control systems, which have evolved for over the last fifty years. Any architectural advancement in this mission-critical portion of the ANSI/ISA-95 automation interface stack must adhere to the strict and resilient requirements of process control. With the SDIS architecture described herein, the ECN system may not only maintain these strict operational requirements, but also may remain open, interoperable, while allowing industry uses to safely, reliably, securely and rapidly introduce or refresh these systems with ongoing technological advancements. The present SDIS architecture enables wider ecosystem participation, innovation and production customization throughout the operational and control stack. For instance, the ECN system may be provided with control disaggregation to serve as a basic control system building block, to amplify control function customization and enable increased process flexibility for a variety of use cases.

Figure 1B:
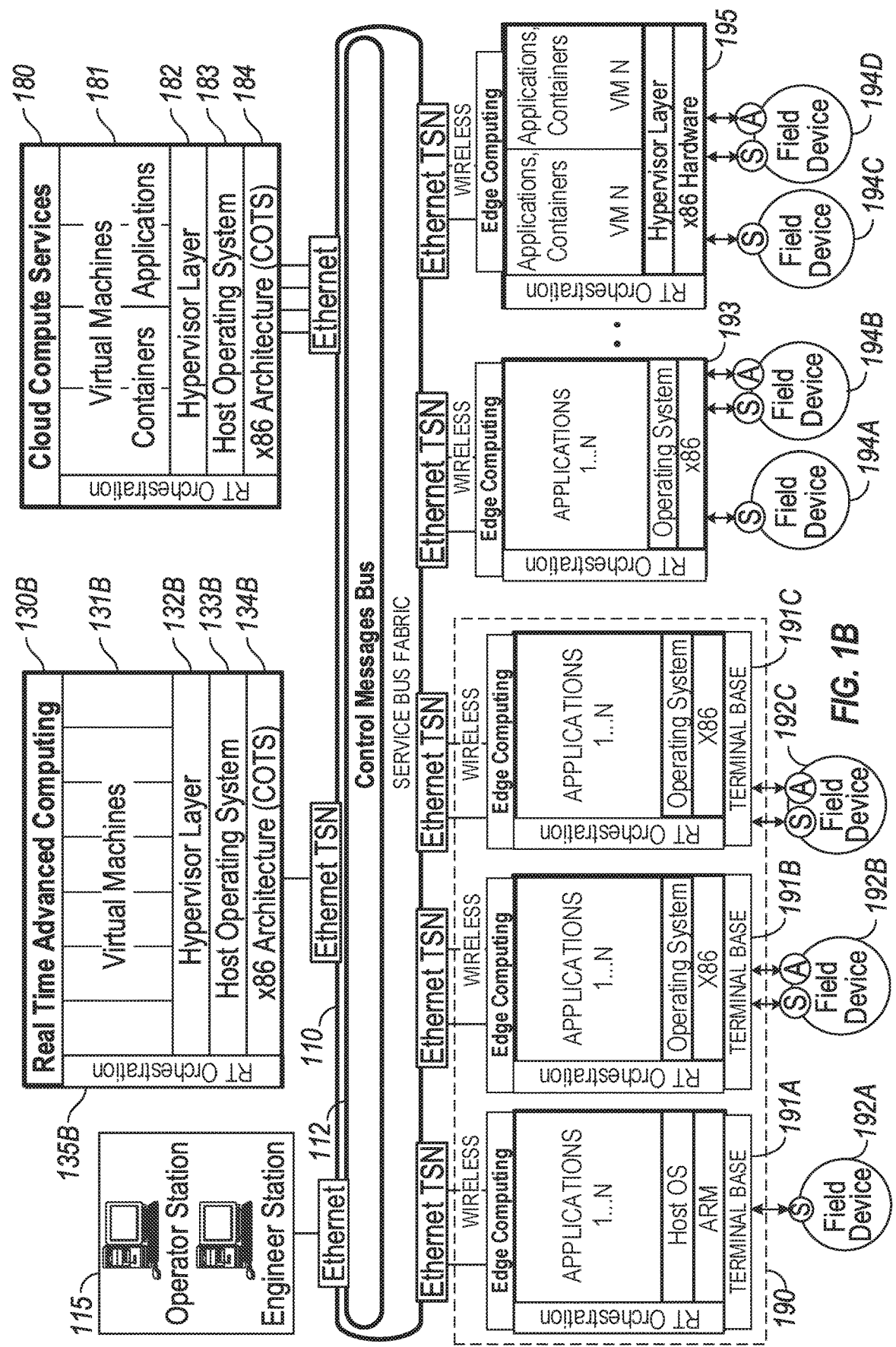
FIG. 1B illustrates a configuration of an SDIS operational architecture, according to a second example.

FIG. 1B depicts a second example configuration of an SDIS operational architecture. In a similar fashion as shown as FIG. 1A, the configuration of FIG. 1B illustrates a control messages bus 112 that is used to connect various components of the operational architecture, with such components including cloud components (a real time advanced computing system 130B, operating as a control server, and cloud computing services 180) edge components (an edge ecosystem 190 with constituent edge computing nodes 191A, 191B, 191C, a first edge computing platform 193, and a second edge computing platform 195), and Control Stations 115. Various field devices (192, 194) with sensors and actuators are connected to the respective edge computing nodes (in the edge ecosystem 190 and edge computing platforms 193, 195). The operational goals and features discussed above are also applicable to the configuration of FIG. 1B.

Figure 3A:
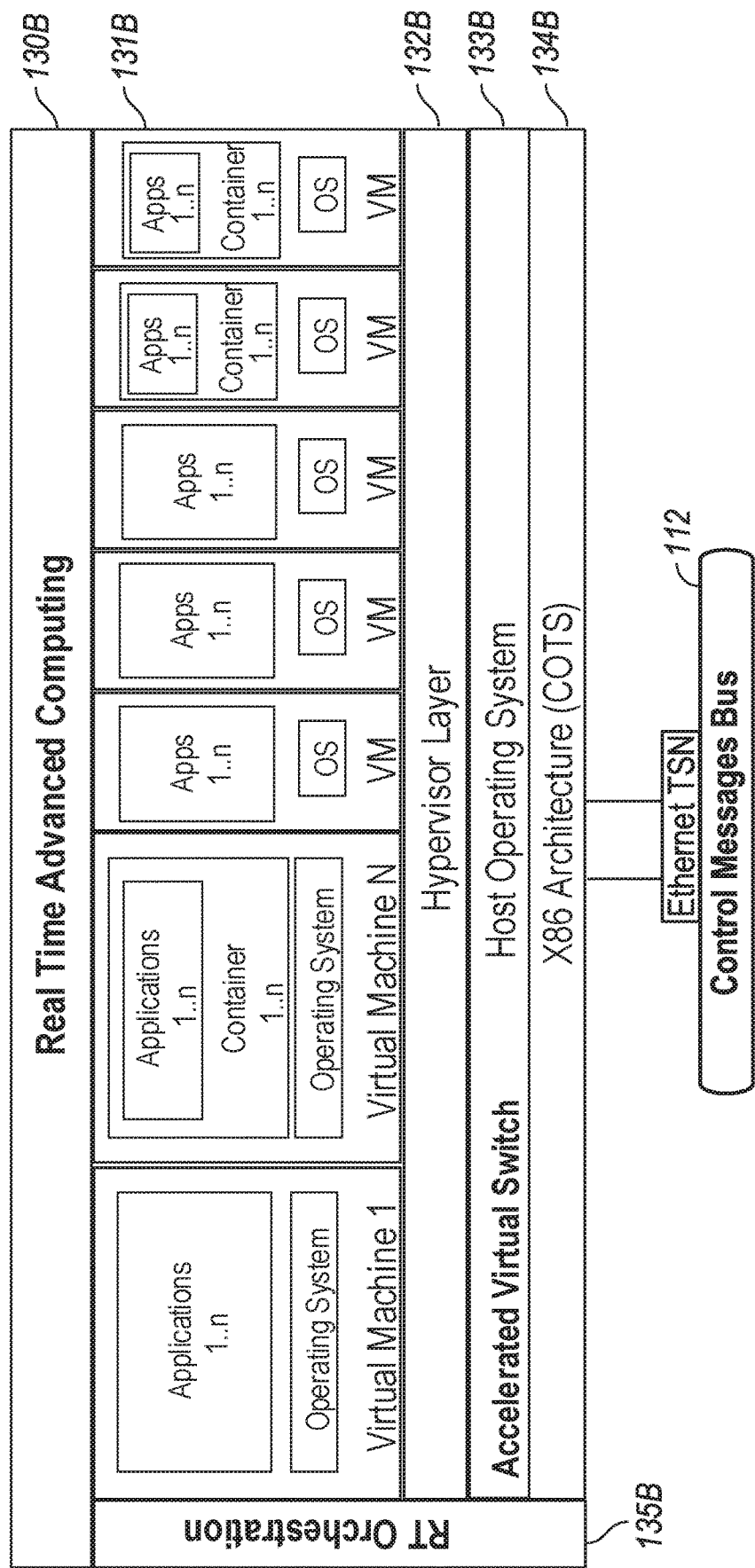
FIG. 3A illustrates a configuration of a real-time advanced computing subsystem deployable within the SDIS operational architecture of FIG. 1B, according to an example.

As a further extension of the SDIS operational architecture introduced in FIG. 1A, the configuration of FIG. 1B illustrates a scenario where the operations of the controllers and servers across the various cloud and edge components are virtualized through respective virtual machines, deployed with respective containers, deployed with respective applications, or any combination thereof. As a result, the SDIS operational architecture of FIG. 1B allows a reconfigurable and flexible deployment to a variety of hardware settings (including both ARM and x86 hardware architectures). A further breakout of the real time advanced computing system 130B is depicted in FIG. 3A, and further breakout of the cloud computing services node 180 and the edge computing node 193 is discussed in FIGS. 3B and 3C respectively.

Another aspect of the SDIS architecture may involve the use of real-time communications. The control messages bus 112, hosted on a service bus fabric 110, may be utilized to enable internetworking convergence on multiple levels. For instance, the control messages bus 112 may enable use of Ethernet transports with time-sensitivity, such as through Ethernet-based time-sensitive networking (TSN) open standards (e.g., the IEEE 802.1 TSN Task Group). Further, use of the control messages bus 112 may allow greater performance and scale at the cloud server rack level and across large networked or chassis of edge nodes.

In the SDIS architecture, real-time services may operate on top of a real-time physical transport via the control messages bus 112, such as via Ethernet TSN. The control messages bus 112 may be adapted to address the heterogeneity of existing middleware or communication stacks in an IoT setting (e.g., with use of Open Platform Communications Unified Architecture (OPC-UA), Object Management Group Data Distribution Service (DDS), OpenDXL, Open Connectivity Foundation (OCF), or the like standards), to enable seamless device-to-device connectivity to address the emerging implementations of IoT deployments.

Figure 2A:
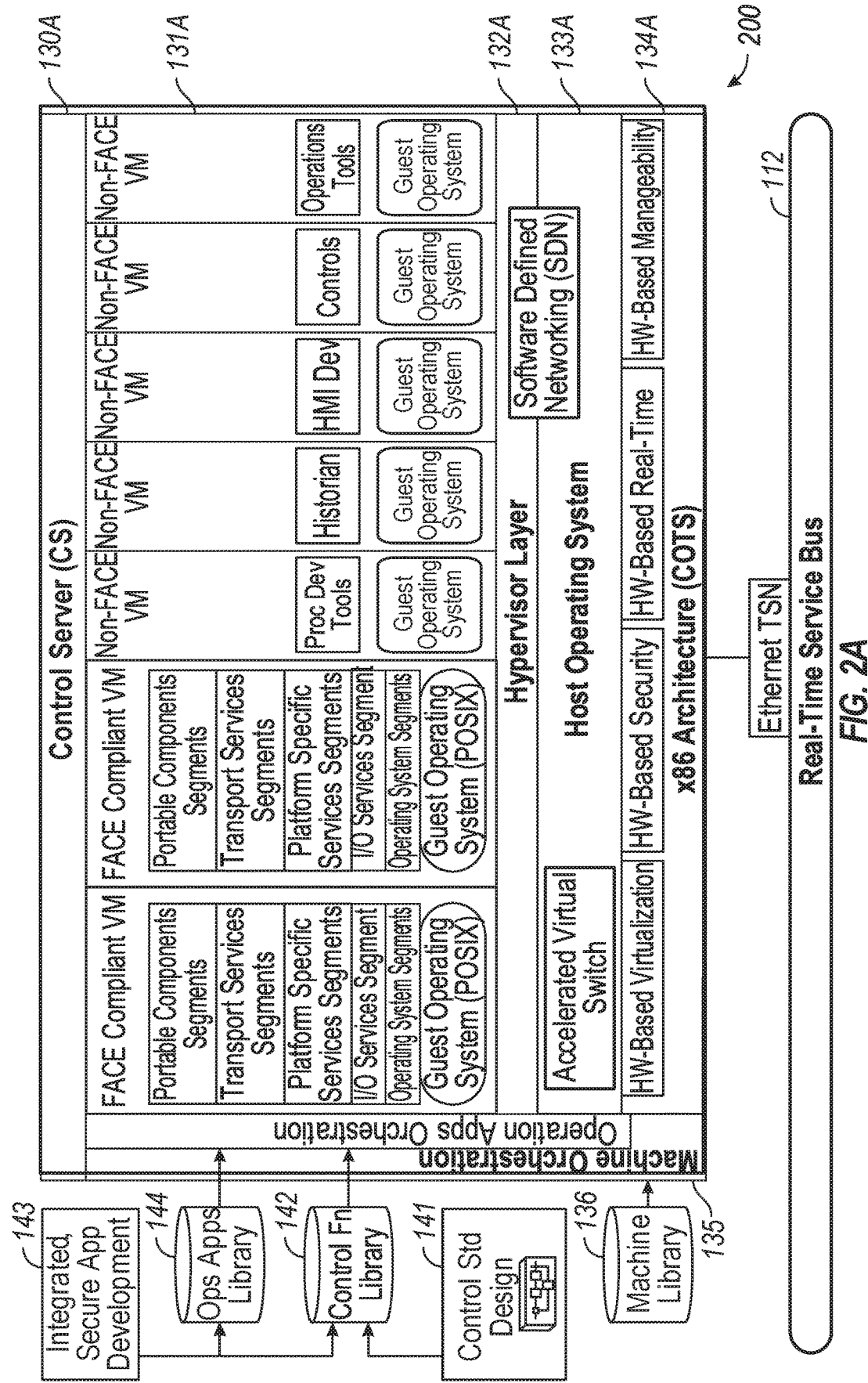
FIG. 2A illustrates a configuration of a real-time advanced computing subsystem deployable within the SDIS operational architecture of FIG. 1A, according to an example.

In an example, the orchestration management for a SDIS architecture may be implemented by a Control Server (CS) design. FIG. 2A illustrates a configuration of a control server subsystem (e.g., implementing the CS node 130A) within an SDIS operational architecture (e.g., the operational architecture discussed above with reference to FIG. 1A). Specifically, FIG. 2A provides a further illustration of the CS node 130A and its component virtual machines 131A, hypervisor 132A, host operating system 133A, and hardware architecture 134A; as depicted, the CS node 130A is shown as a single node but may include two or more nodes with many virtual machines distributed across these nodes.

In an example, the CS node 130A may include orchestration 135A that is facilitated from machine and operation application orchestration. The machine orchestration may be defined with use of a machine library 136, such as a database for implementing platform management; the operation application orchestration may be defined with use of a control function library 142 and operational application library 144. For instance, control standards design 141 and integrated (and secure) application development processes 143 may be used to define the libraries 142, 144.

In an example, the CS node 130A is designed to host ISA level L1-L3 applications in a virtualized environment. This may be accomplished by running virtual machines (VMs) 131A on top of a hypervisor 132A with each VM encapsulating Future Airborne Capability Environment (FACE)-compliant stacks and applications, or non-FACE applications such as a human-machine interfaces (HMIs), Historians, Operations Tools, etc. In an example, FACE-compliant VMs may provide an entire FACE stack (operating system, FACE segments, and one or more portable components) that is encapsulated in a VM.

The encapsulation means that each VM may have its own virtual resources (compute, storage, memory, virtual networks, QoS, security policies, etc.) isolated from the host and other VMs by the hypervisor 132A, even as each VM may be running different operating systems such as Linux, VxWorks, or Windows.

To maximize the benefit of virtualization and robustness, related groups of portable components may be grouped in a FACE-compliant VM and with the use of multiple FACE-compliant VMs. Using this approach spreads the workload across the CS hardware and isolates resources specific to that group of components (such as networks), while still allowing the applications to communicate with other virtualized and physical devices such as ECNs through the network. Distributing the FACE portable components across VMs increases security by isolating unrelated components from each other, provides robustness to failures, allows independent update of functions, and eases integration to allow individual vendors to provide fully functioning VMs into the system.

In a further example, Layer 2 components may be separated from Layer 3 components within separate VMs (or groups of VMs) to provide isolation between the layers and allow different network connectivity, security controls, and monitoring to be implemented between the layers. Grouping portable components may also provide benefits to integration, to allow multiple vendor solutions to be easily combined running multiple virtual machines and configuring the network between them. Also in a further example, additional operating systems such as Windows, Linux, and other Intel architecture-compatible operating systems (e.g. VxWorks real-time operating system) may each be deployed as virtual machines. Other configurations of the presently disclosed VMs within a CS node 130A may also enable other technical benefits.

In an example, a cloud infrastructure platform may be utilized in the CS node 130A, such as a real-time advanced computing system adapted with use of open source standards and implementations such as Linux, KVM, OpenStack, and Ceph. For instance, the cloud infrastructure platform may be adapted to address critical infrastructure requirements such as high availability of the platform and workloads, continuous 24/7 operation, determinism/latency, high performance, real-time virtualization, scalability, upgradeability, and security. The cloud infrastructure platform also may be adapted to meet software-defined industrial automation-specific critical infrastructure requirements.

Figure 2B:
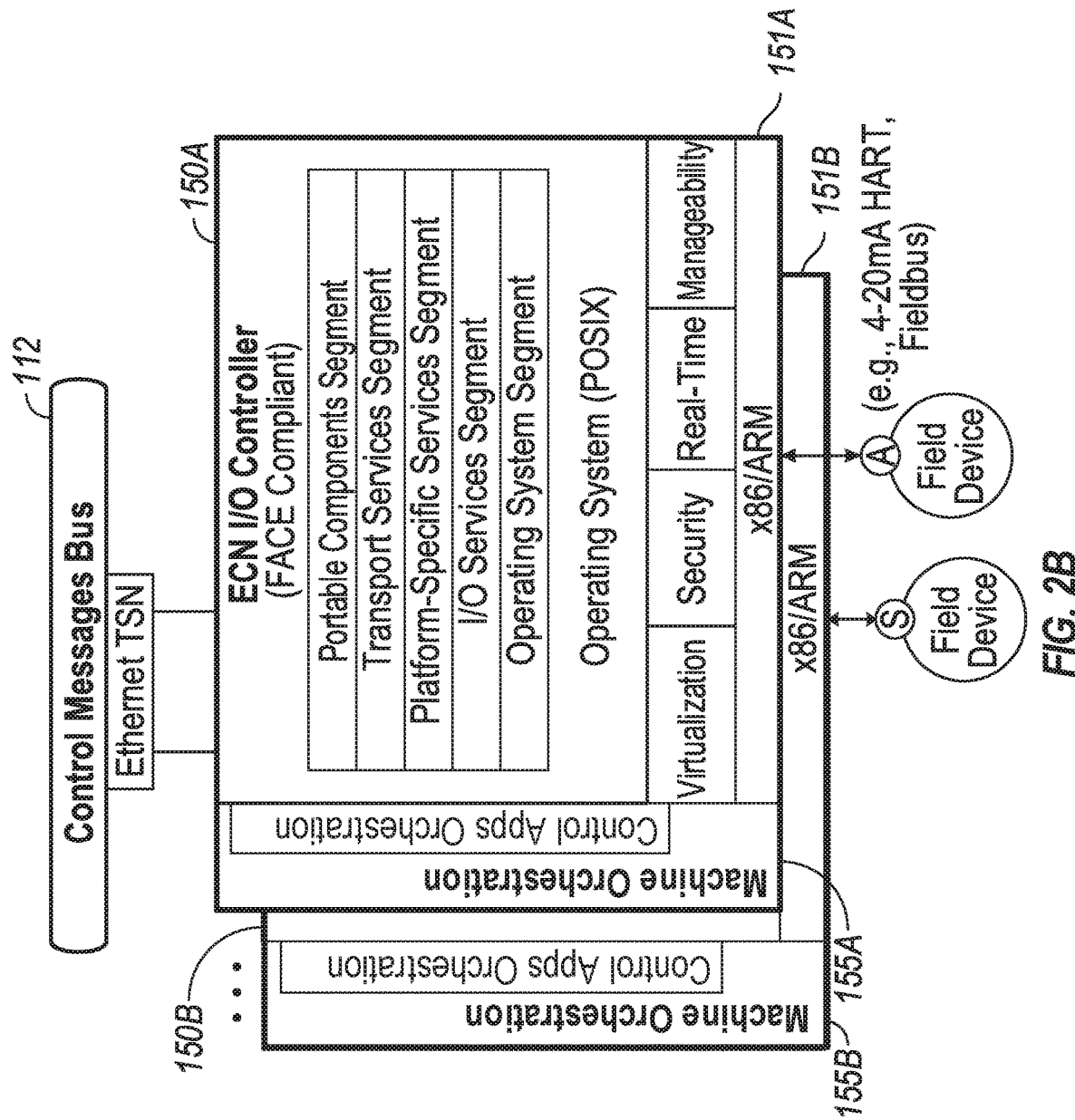
FIG. 2B illustrates a configuration of an edge control node subsystem deployable within the SDIS operational architecture of FIG. 1A, according to an example.

FIG. 2B illustrates an example configuration of a distributed edge control node (ECN) subsystem within an SDIS operational architecture (e.g., the operational architecture discussed above with reference to FIG. 1A). In an example, the ECN nodes 150A, 150B reside in the ISA-95 Level 1/Level 2 and are positioned as a fundamental, basic HW/SW building block.

In an example, the ECN nodes 150A, 150B support a single input or output to a single field-bus device via a sensor or actuator or smart device (e.g., located externally to an ECN cabinet). The ECN device architecture may be extended through an ECN cabinet or rack system that extends the openness and flexibility of the distributed control system addressing wiring, upgrade, and fault-tolerance limitations with existing proprietary DCS systems. In an example, the ECN architecture operates in a standard POSIX OS with a FACE-compliant stack implemented as segments or groups software modules. Various approaches for deployment of these software modules are referenced in the examples below.

The ECN nodes 150A, 150B may support a variety of software-defined machines for aspects of orchestration and services (such as the orchestrations depicted below for FIG. 6). In an example, the ECN nodes 150A, 150B may integrate with various hardware security features and trusted execution environment, such as Intel® Software Guard eXtensions (SGX), Dynamic Application Loader (DAL), secure VMM environments, and trusted computing-standard Trusted Platform Module (TPM). In a further example, secure boot may be enabled with fused and protected key material accessed within protected hardware cryptographic engines, such as Intel® Converged Security and Manageability Engine (CSME) and Platform Trust Technology (PTT). Additionally, cryptographic functions may be made more secure with special hardware instructions for AES encryption and SHA computations. Other forms of security such as an Intel® Enhanced Privacy ID (EPID) may be being adopted across the industry as a preferred device identity key, which can be enabled through automated device registration (e.g., Intel Secure Device Onboarding (SDO)) technology for secure, zero-touch onboarding of devices. In further examples, the ECN nodes 150A, 150B and other subsystems of the SDIS architecture may be interoperable with these or other security approaches.

FIG. 3A illustrates a more detailed configuration of the real-time advanced computing system 130B deployable within the SDIS operational architecture of FIG. 1B. Specifically, the configuration of FIG. 3A illustrates the operation of respective virtual machines 131B which may include different deployment types of virtual machines, containers, and applications, operating on a hypervisor layer 132B. The hypervisor layer 132B may be controlled with use of a host operating system 133B, as the VMs, hypervisor, and operating system execute on the hardware architecture 134B (e.g., a commercial off-the-shelf (COTS) x86 architecture). The aspects of real time orchestration 135B may be integrated into all levels of the computing system operation. Thus, a x86 computing system may be adapted to coordinate any of the cloud- or server-based SDIS functions or operations discussed herein. Other aspects of functionality or hardware configuration discussed for the CS node 130A may also be applicable to the computing system 130B.

FIGS. 3B and 3C illustrates a more detailed configuration of cloud computing 180 and edge computing 193 subsystems, respectively, deployable within the SDIS operational architecture of FIG. 1B. In a similar fashion as depicted in FIG. 3A, a series of virtual machines 181, 196, hypervisor layers 182, 197, host operating systems 183, 198, and COTS x86 hardware architectures 184, 199 depicted in FIGS. 3B and 3C may be adapted to implement the respective systems 180, 193. Applications and containers may be used to coordinate the cloud- and edge-based functionality, under the control of real-time orchestration. Other aspects of functionality or hardware configuration discussed for the ECN nodes 150 may also be applicable to the edge computing node 193. The edge computing node 193 may implement control functions to control a field device.

Systems and techniques described herein may integrate "Mobile-edge Computing" or "Multi-Access Edge Computing" (MEC) concepts, which accesses one or multiple types of Radio Access Networks (RANs) to allow increases in speed for content, services, and applications. MEC allows base stations to act as intelligent service hubs, capable of delivering highly personalized services in edge networks. MEC provides proximity, speed, and flexible solutions to a variety of mobile devices, including devices used in next-generation SDIS operational environments. As an example, a MEC approach is described in "Mobile-Edge Computing, A key technology towards 5G," a paper published by the European Telecommunications Standards Institute (ETSI) as ETSI White Paper No. 11, by Yun Chao Hu, et al., ISBN No. 979-10-92620-08-5, available at http://www.etsi.org/news-events/news/1009-2015-09-news-new-white-paper-etsi-s-mobile-edge-computing-initiative-explained, which is incorporated herein in its entirety. It will be understood that other aspects of 5G/next generation wireless networks, software-defined networks, and network function virtualization, may be used with the present SIDS operational architecture.

Figure 4:
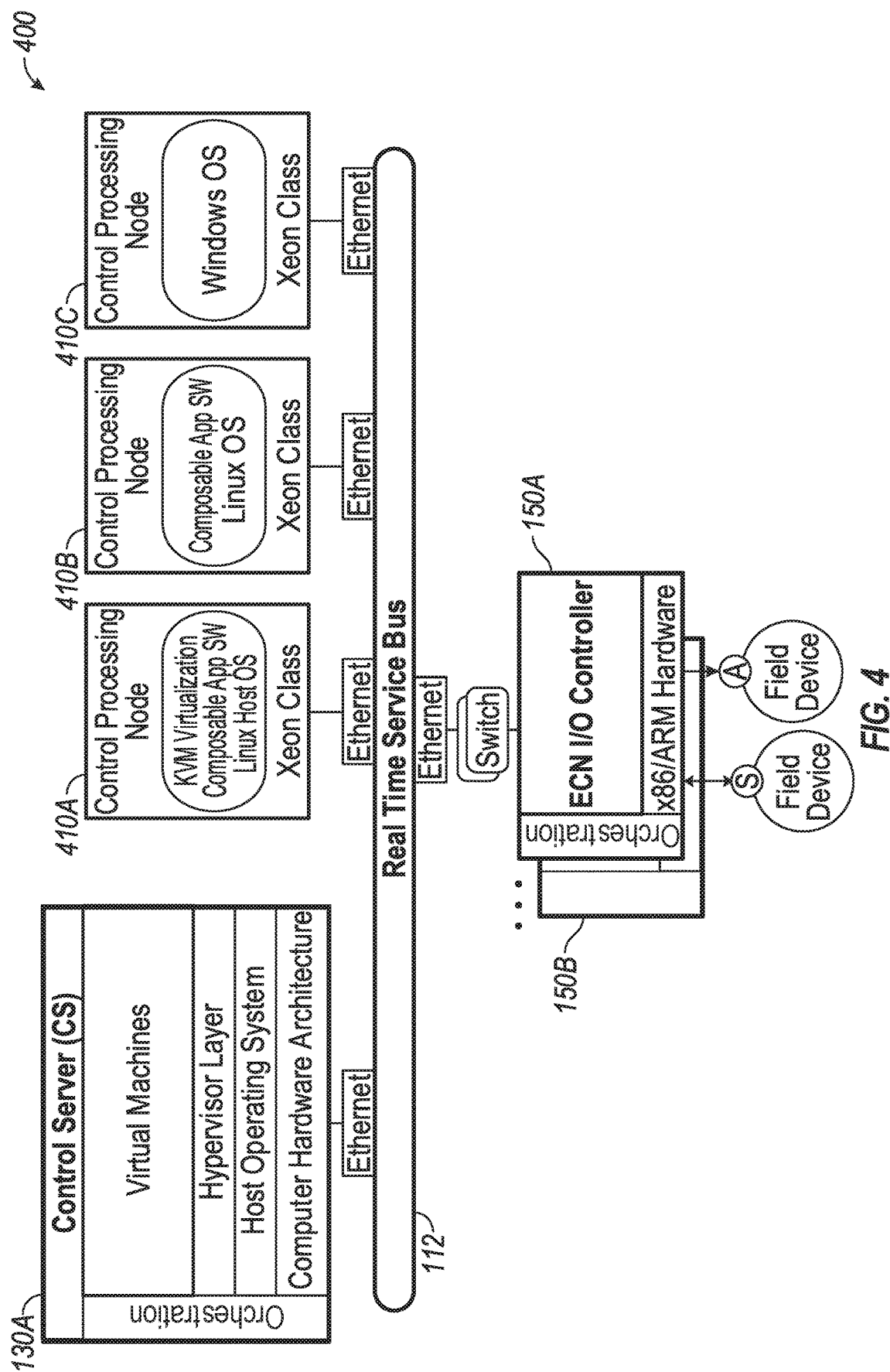
FIG. 4 illustrates a configuration of a control messages bus used within an SDIS operational architecture, according to an example.

FIG. 4 illustrates an example configuration 400 of a real-time service bus (e.g., a configuration of the control messages bus 112) used within an SDIS operational architecture. This configuration allows support for various processing control nodes, as discussed herein. For instance, the control messages bus 112 may be used to connect respective control processing nodes 410 (including various hardware and software implementations on nodes 410A, 410B, 410C) and cloud-based services or control server(s) 130A with various edge devices 420 (e.g., I/O controllers 150, 160, 165, or edge computing nodes 191, 193, 195).

In an example, the control messages bus 112 may be implemented to support packet level, deterministic, control networks, with rate monotonic control requirements. These features have conventionally been provided by proprietary Distributed Control System (DCS), Supervisory Control And Data Acquisition (SCADA) or Programmable Logic Controller (PLC) components. Most of these systems were engineered to design parameters that limited the number of nodes and data elements with little ability to dynamically manage the quantity and quality of the data for what is commonly a closed and isolated network within the facility. Over the lifecycle of these systems, the desire to implement emerging new use cases has been severely limited by the underlying inflexibility and limited scalability of expensive control system infrastructure.

With prior approaches, both open source and open standards-based service bus middleware options have matured to the point that the critical mission ecosystem of solution providers have embraced these technologies as "best-in-breed" capabilities to build scalable, highly redundant, fault tolerant, real-time systems at a fraction of the historical cost. This has sparked a realization of new use cases that may be achieved for both discrete and continuous processing where commodity level hardware and open source, standards based software have converged to enable real-time compute methods, while maintaining service oriented architecture based design principles.

In an example, control messages bus technologies may be extended further by enabling real-time compute at the hardware level by enabling Time Sensitive Networking (TSN) and Time Coordinated Compute (TCC) both between and within platform nodes of a network. Both proprietary and open standard-based solutions may be integrated with commodity hardware enabled enhancements, including utilizing industry standards offered by the OPC-UA (OPC Unified Architecture) and DDS (Data Distribution Service) groups, and proprietary implementations like the SERCOS standards where hard real-time requirements for discrete motion control are mandatory in robotic and machine control applications.

In an example, the control messages bus and the overall SDIS architecture may also be integrated with the Industrial Internet Consortium (IIC) features. These may include various formulating and testing standards for the industrial use of TSN, which may enhance the performance and QoS of both DDS and OPC-UA based solutions by dramatically reducing both packet level latency and jitter. Further, aspects of Object Management Group (OMG) and the OPC Foundation standards may be positioned to support increased integration of OPC-UA and DDS implementation models that leverage the information modeling of OPC-UA, and the QoS and performance capabilities of DDS in architectural design. New use cases may include analytics and autonomous capabilities.

In an example, the SDIS architecture may be integrated with the use of Software Defined Networking (SDN) features. SDN is a movement towards a software programmable network that separates the control plane from the data plane to make the network and network functions more flexible, agile, scalable, and less dependent on networking equipment, vendors, and service providers. Two key use cases of SDN relevant to SDIS include: service function chaining, which allows dynamic insertion of intrusion detection/prevention functions, and dynamic reconfiguration to respond to events such as larger scale outages such as zone maintenance, natural disasters, etc. Further, the SDIS architecture may be integrated with an SDN controller to control virtual switches using networking protocols such as Open vSwitch Database Management Protocol (OVSDB). Other use cases of SDN features may involve dynamic network configurations, monitoring, and the abstraction of network functions in virtualized and dynamic systems.

Figure 5A:
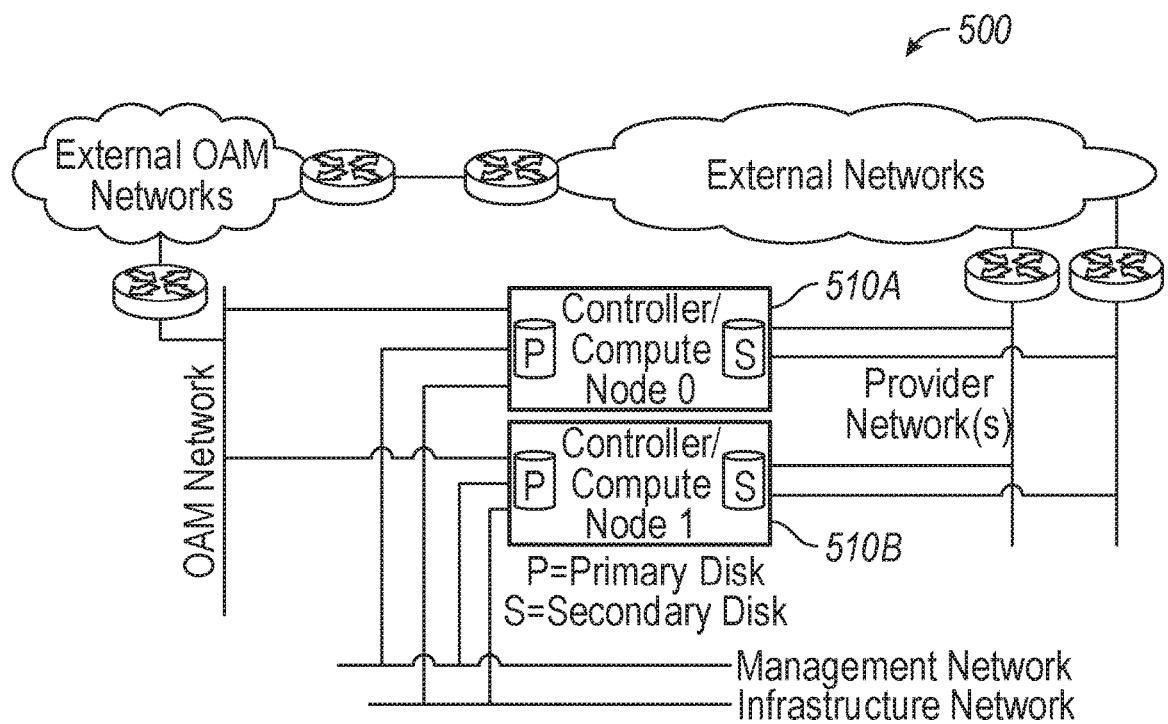
FIG. 5A illustrates a first network configuration for deployment of SDIS subsystems, according to an example.

FIG. 5A illustrates a first network configuration 500 for an example deployment of SDIS subsystems. The first network configuration 500 illustrates a scaled-down, small-footprint deployment option that combines controller, storage, and compute functionality on a redundant pair of hosts (nodes 510A, 510B). In this configuration, the controller functionality (for control applications or implementations) is active/standby across the nodes 510A, 510B while the compute functionality (for all remaining processes) is active/active, meaning that VMs may be deployed to perform compute functionality on either host.

For example, LVM/iSCSI may be used as the volume backend that is replicated across the compute nodes, while each node also has a local disk for ephemeral storage. Processor bandwidth and memory may be also reserved for the controller function. This two-node solution may provide a lower cost and lower footprint solution when less processing and redundancy is needed.

Figure 5B:
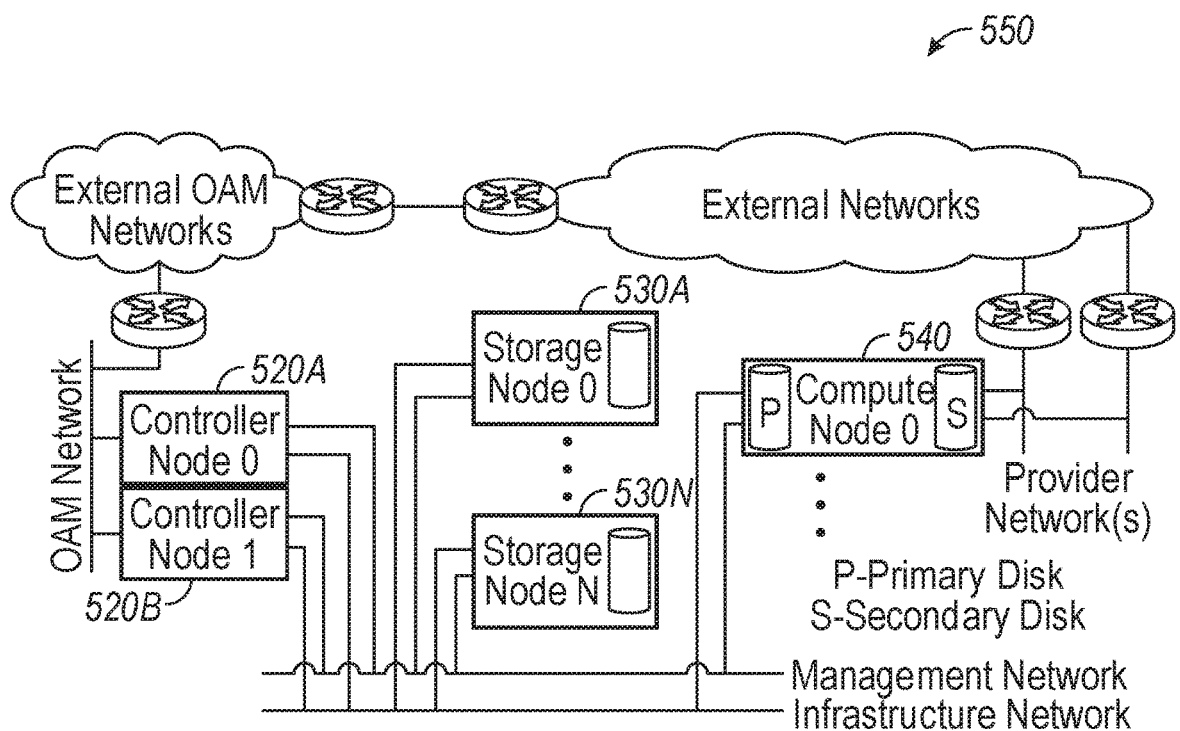
FIG. 5B illustrates a second network configuration for deployment of SDIS subsystems, according to an example.

FIG. 5B illustrates a second network configuration for deployment of SDIS subsystems. The second network configuration 550 may provide dedicated storage nodes with high capacity, scalability, and performance. As compared with the first network configuration 500, the second network configuration 550 allows controller, storage, and compute functionalities to be deployed on separate physical hosts, allowing storage and compute capacity to scale independently from each other.

In an example, the second network configuration may be provided from a configuration of up to eight storage nodes (nodes 530A-530N) and eight disks per storage node in a high availability (e.g., Ceph) cluster (e.g., coordinated by controller nodes 520A, 520B), with the high availability cluster providing image, volume, and objects storage for the compute nodes. For instance, up to 100 compute nodes (e.g., node 540) may be supported, each with its own local ephemeral storage for use by VMs. As will be understood, a variety of other network configurations may be implemented with use of the present SDIS architecture.

The SDIS architecture and accompanying data flows, orchestrations, and other features extended below, may also utilize aspects of Machine Learning, Cognitive Computing and Artificial Intelligence. For instance, The SDIS architecture may be integrated with a reference platform with foundations in hardware-based security, interoperable services, and open-source projects, including the use of big data analytics and machine learning for cybersecurity. The SDIS architecture may utilize immutable hardware elements to prove device trust, and characterize network traffic behavior based on filters augmented with machine learning to separate bad traffic from benign.

The various components of the SDIS architecture may be integrated with a rich set of security capabilities to enable an interoperable and secure industrial system within real-world industrial settings. For example, such security capabilities may include hardware-based roots of trust, trusted execution environments, protected device identity, virtualization capabilities, and cryptographic services upon which a robust, real-time security architecture may be founded. The configuration and functionality of such components within a functional SDIS architecture deployment is further discussed in the following sections.

Overview of Functional Orchestration

Figure 6:
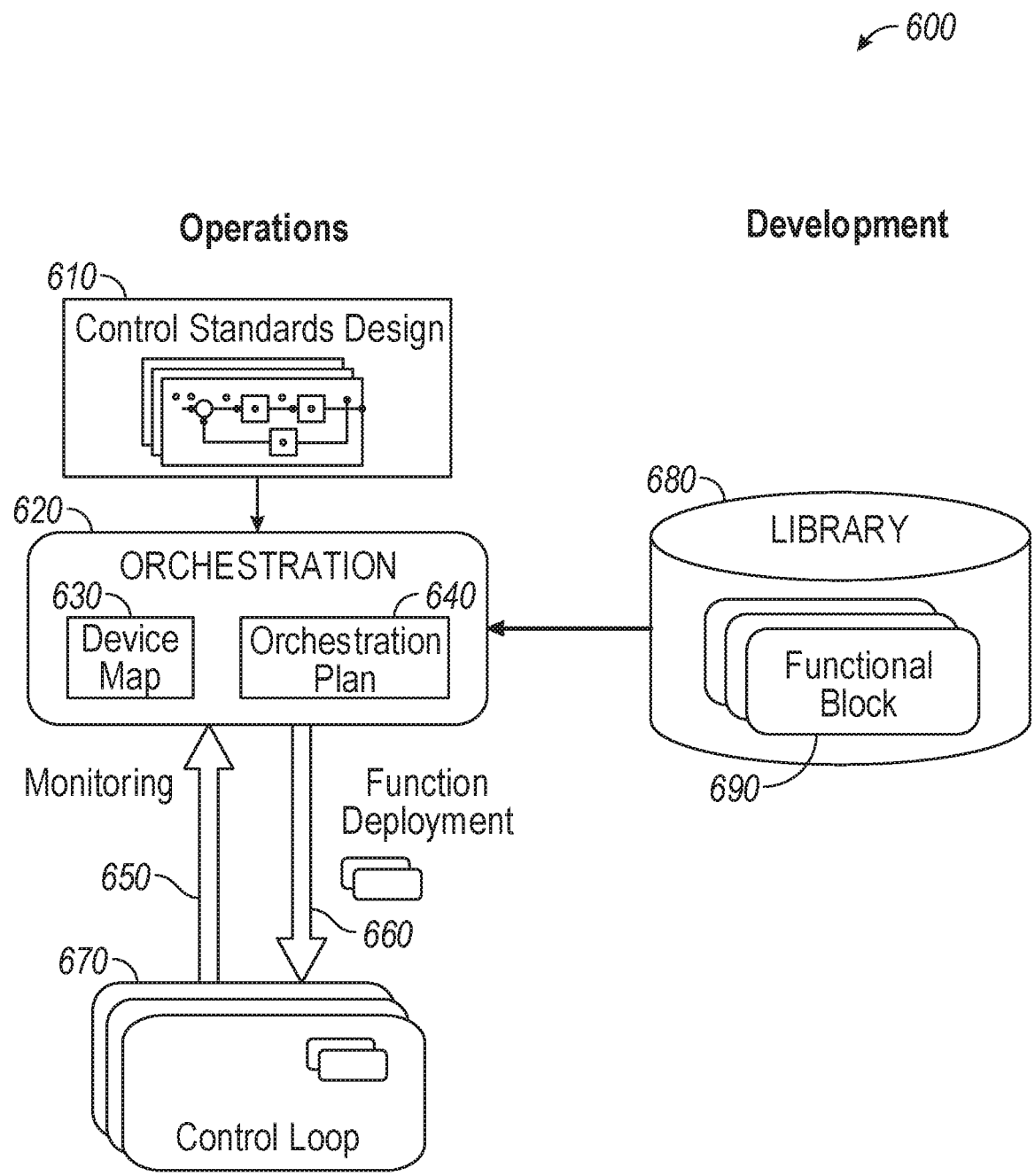
FIG. 6 illustrates a dynamically established set of orchestration operations in a SDIS operational architecture, according to an example.

FIG. 6 illustrates an example of dynamically established set of orchestration operations 600 with use of a Composable Application System Layer (CSL) in a SDIS operational architecture. The CSL may be utilized to enable a secure design and orchestration of control functions and applications to support industrial operations.

In an example, the CSL maintains a library 680 of functional blocks 690, each representing control-loop logic and application components. Each functional block may be interoperable with other functional blocks. A functional block may have multiple implementations, making it portable, such that it may operate on various platform architectures and leverage special features if available (e.g. hardware accelerators). In an example, the CSL provides a control function for a cluster of edge nodes (e.g., ECNs); in further examples, the CSL provides control for VMs in the control server or other computation points in the SDIS operational architecture.

In an example, a process engineer (or other operator) defines control flows and applications by combining and configuring existing functional blocks 690 from the library 680. These functional blocks 690 may represent application logic or control loops (e.g., control loops 670, data storage, analytics modules, data acquisition or actuation modules, or the like), control modules, or any other computation elements. Because these functional blocks 690 are reusable and interoperable, new code needs to be written only when new functional blocks are required. In further examples, such functional blocks may be utilized to implement end-to-end logic, including control flows or end-to-end applications using a graphical, drag-and-drop environment.

Starting from this application design, the CSL generates an orchestration plan 640 that specifies the required functional blocks and the requirements for points of computation to execute those functional blocks. As discussed in the following sections, orchestration 620 may encompass the process of mapping the orchestration plan 640 to available compute and communication resources. The orchestration 620 may be further adapted based on control standards design 610 (e.g., to conform the resulting orchestration to various control laws, standards, or requirements).

In an example, the CSL maintains a map 630 of computing and control resources across the SDIS network. The map 630 comprehends the topology of various compute points, from virtual machines in a data center to control points and the attached sensors and actuators. The map 630 also includes the hardware capabilities and dynamic characteristics of the control points. The map is updated regularly, allowing the system to constantly adapt to component failures. The orchestration 620 and the control loop 670 communicate using monitoring logic 650 and function deployments 660. The monitoring logic 650 outputs information from a field device or the control loop 670, which is used as an input to the map 630. The function deployment 660 is used as an input or state setting for the control loop 670.

When an operator deploys a new application definition (e.g., the orchestration 620 receives an output from the control standards design 610), the orchestration 620 determines how to best fit the functional blocks 690 to the set of available resources in map 630, and deploys the underlying software components that implement the functional blocks 690. Deployment of an end-to-end application may include, for example, creating virtual machines within a server, injecting code into control loops (e.g., control loops 670), and creating communication paths between components, as needed. Orchestration 620 also may be dynamic to allow functional blocks to be migrated upon failure of a computational resource, without requiring a system-wide restart. In addition, updates to the implementation of a component may be pushed, causing code to be updated as needed.

The CSL may also incorporate security and privacy features, such as to establish trust with participating devices (including edge nodes or a control server). In further examples, the CSL may be integrated with key-management used for onboarding new devices and revoking obsolete devices. The CSL may deliver keys to function blocks 660 to enable secure communication with other function blocks 660. The CSL may also deliver secured telemetry and control, integrity and isolated execution of deployed code, and integrity of communication among functional blocks 690.

Orchestration technologies today predominantly execute by function, application, virtual machine, or container technology. However, inherent dependencies between distributed applications are not generally managed in low-latency, high frequency mission-critical timeframes for control strategy implementations today. For embedded systems in general, dynamic orchestration historically has not been applied due to the technical limitations of managing application dependencies at runtime.

In an example, features of an SDIS architecture may be adapted to support the holistic orchestration and management of multiple dependent applications (function blocks) that execute across a distributed resource pool, to enable orchestration at an embedded control strategy level in a distributed system configuration. This provides a control strategy orchestration capability to operational technology environments while elevating overall system performance at an expected reduced total cost. For instance, an example orchestration method may incorporate dynamic network discovery, resource simulation in advance of any orchestration action, and simulation coupled with global resource optimization and prediction utilized as part of an orchestrator rule set decision tree.

The distributed resource pool may encompass applications that span: (a) a single application running in a single native device, where a second redundant application is available on an additional native device; (b) multiple coordinated applications running in multiple native devices; (c) multiple coordinated applications running in a single virtual machine, where the virtual machine is running on a single embedded device or server; (d) multiple coordinated applications running across multiple virtual machines, where each virtual machine runs in a dedicated embedded device or server; (e) multiple coordinated applications that span multiple containers contained in one virtual machine, where the virtual machine runs in a dedicated embedded device or server; or (f) multiple coordinated applications spanning multiple containers, where the containers are running on multiple embedded devices or servers. Any mixture of these application scenarios may also apply.

In an example, orchestration may include measurement of resources or reservation of resources, such as compute resources on a node (e.g., on the CPU or special purpose compute blocks like an FPGA or GPU), particular device capabilities (access to a sensor/actuator, security device (e.g., TPM), pre-installed software), storage resources on a node (memory or disk), network resources (latency or bandwidth, perhaps guaranteed via TSN), or the like.

An extended orchestrator rule set may be defined to include criteria beyond standard compute, storage, and memory metrics, such as to specify application cycle time, application runtime, application input/output signal dependency, or application process sequencing (e.g. a mandatory sequence that specifies which application(s) runs before or after other application blocks). This orchestration technique may provide the ability, at a distributed application control strategy level, to leverage lower cost commodity hardware and software to achieve better system performance at a control strategy level, while enabling new levels of system redundancy and failover at a lower cost across multiple applications running in ISA levels L1-L3. Further, orchestration sensitivity at the broader control strategy level may enable new levels of high availability for embedded systems at a lower cost. This may result in an increase of general system and application uptime for orchestrated and coordinated control applications, while reducing unplanned downtime for production operations at a higher ISA level than available with conventional approaches.

The following orchestration techniques may also enable additional maintenance tasks to occur (without production downtime) for systems where system redundancy is designed into the automation configuration. These techniques enable increased interoperability for where control strategies execute among vendor hardware where platform agnostic virtualization and containerization is leveraged. These techniques also leverage current, historical and simulation results to optimize workload placement for operational technology environments for real-time operations. Further, these techniques may leverage predictions of future orchestration events to pre-plan workload placement.

In an example, a distributed resource pool is defined as a combination of compute, storage, memory across networked computing assets with the addition of function block scheduling frequency, before and after processing assignments, latency tolerance for the purpose of executing application control strategies. For instance, a control strategy (or application), may be defined by a physically distributed, coordinated set of building blocks with very strict time, block-to-block scheduling, and run-time requirements for execution. The orchestration of these building blocks in time is coordinated with respect to the order of execution, processing latency and full execution cycle of all building blocks that make up the overall application control strategy.

Scalable Edge Compute in a Distributed Control Environment

Current solutions require the end user to estimate the amount of compute required, and add additional compute capability to future proof the deployment. These approaches waste money, electrical, and thermal energy. This also risks the over provisioned compute becoming old technology before the compute is actually needed.

The techniques discussed herein allow a high performance CPU to be activated, from an initial dormant or inactive state, in an edge control node of an industrial control system by a centralized orchestration system that understands the CPU performance needs of the control strategy of the industrial system. Initial customer investment is low, as each edge control node is initially sold as a low cost, low performance device. Only the required compute (right sized compute) is purchased and provisioned, which optimizes the monetary investment, thermal footprint and electrical energy consumption. This solution provides an expandable compute footprint in the control system.

Figure 7:
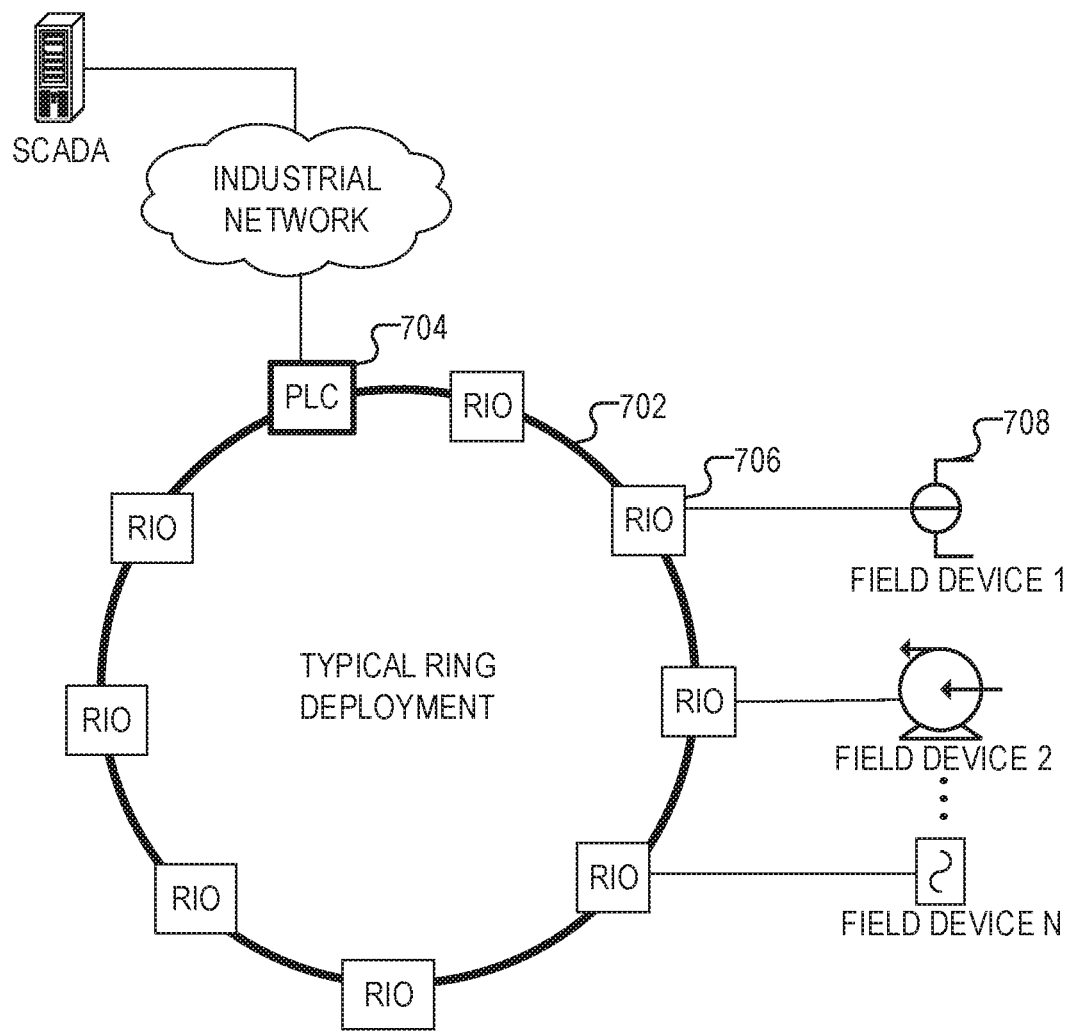
FIG. 7 illustrates an industrial control system ring topology diagram.

FIG. 7 illustrates an industrial control system (ICS) Ring Topology network 702.

An industrial control system is generally made up of Programmable Logic Controller 704, Remote 10 (RIO) (e.g., 706) and Field Devices (e.g., 708). A typical deployment may consist of rings of Remote IO units controlled by a PLC 704. IO and field compute are typically locked in PLC 704 (e.g., at FIG. 7).

Figure 8:
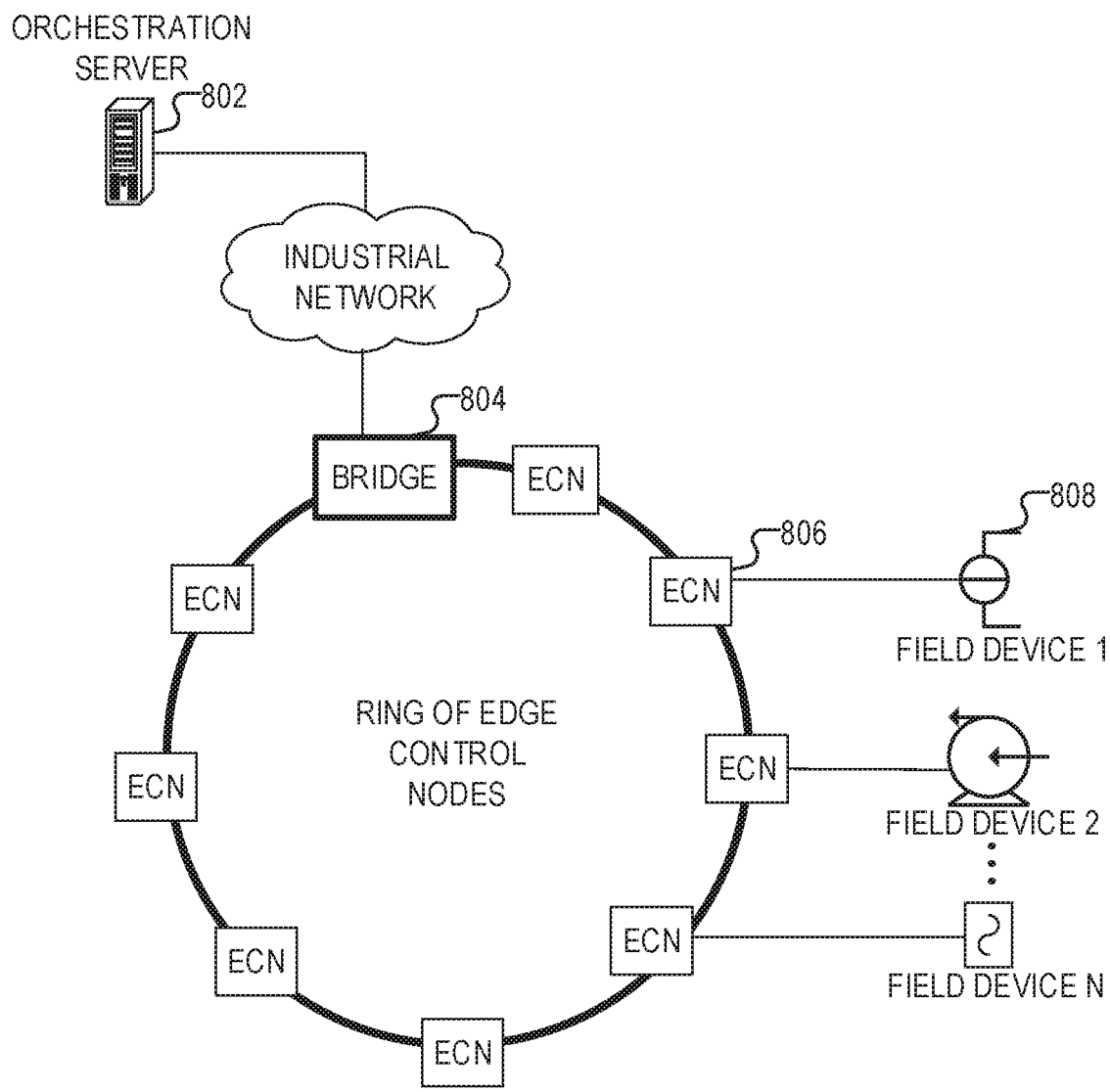
FIG. 8 illustrates an edge control topology diagram.

FIG. 8 illustrates an edge control topology network. The edge control topology network includes an orchestration server 802 (e.g., as described above for orchestration 620), a bridge 804, a plurality of edge control nodes (e.g., ECN 806), and one or more field devices (e.g., 808). The orchestration server 802 is used to provision, control, or orchestrate actions at the ECN devices (e.g., 806), which are connected for example in a ring network to each other, and to the orchestration server 802 via the bridge 804).

One way that SDIS improves the functioning of a system is the distribution of control functionality across an ICS. The orchestration server 802 may be used to control the edge control node 806, which includes the option of performing both IO and Compute on a single device and uses Orchestration services to distribute workloads to the best available resource.

Typically the ring of edge control nodes (ECNs) may be deployed in thermally constrained environments, for example, cabinets with zero airflow or unregulated temperatures. In an example, there may be up to 96 IO in a single cabinet, which means up to 96 ECNs. This may prohibit each ECN from including both IO and High Performance compute, as the high performance compute device will generate excessive heat and raise the ambient temperature above the safe operating level of the ECNs. Additionally, a high performance processor may not be needed at every ECN when there is not a high compute demand of the control system. Therefore, the systems and techniques described herein provide a capability to install just the compute resources that are needed to execute the control strategy, and to not exceed cost and power targets, while still allowing for changes in each ECN. Thus, in an example, not every ECN has a high performance processor or high control capabilities.

Figure 9:
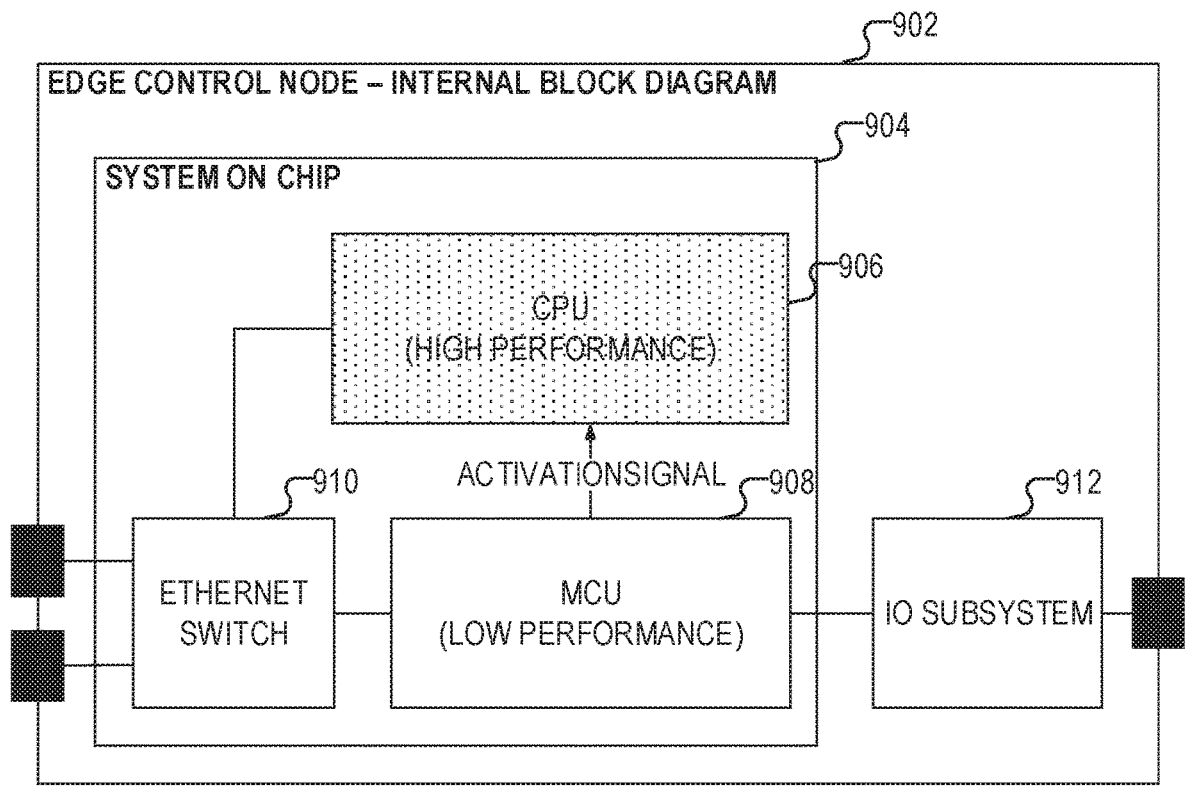
FIG. 9 illustrates an edge control node block diagram.

FIG. 9 illustrates an edge control node (ECN) block diagram 902. In an example, the following techniques provide a "right size" provisioning of a compute problem with the introduction of a compute scalable ECN as shown in FIG. 9.

The primary ingredient of the ECN 902 may be a system on chip 904, which has both higher performance compute (e.g., CPU) 906 and a microprocessor (MCU) 908 for low performance compute. The MCU 908 may be used to convert IO data coming from the IO Subsystem 912 to a network component 910, such as an Ethernet TSN based middleware such as OPCUA Pub/Sub or DDS. The ECN 902 may be delivered to customers with the High Performance CPU 906 in an inactive state. For example, the High Performance CPU 906 may not be accessible for use in the inactive state, such as until a special "activation signal" is sent to the High Performance CPU 906, for example from an orchestrator (e.g., the orchestrator may send a signal sent to the MCU 908 to activate the CPU 906).

The ECN 902 may be initially installed as a low cost, low power device for IO conversion using the MCU 908. For example, the High Performance CPU 906 is initially disabled, and initially the ECN 902 includes the SoC 904 and IO Subsystem 912 activated, without high control capabilities. The high performance processor 906 may be inactive, with the ECN 902 only allowing IO Conversion initially, in an example.

Figure 10:
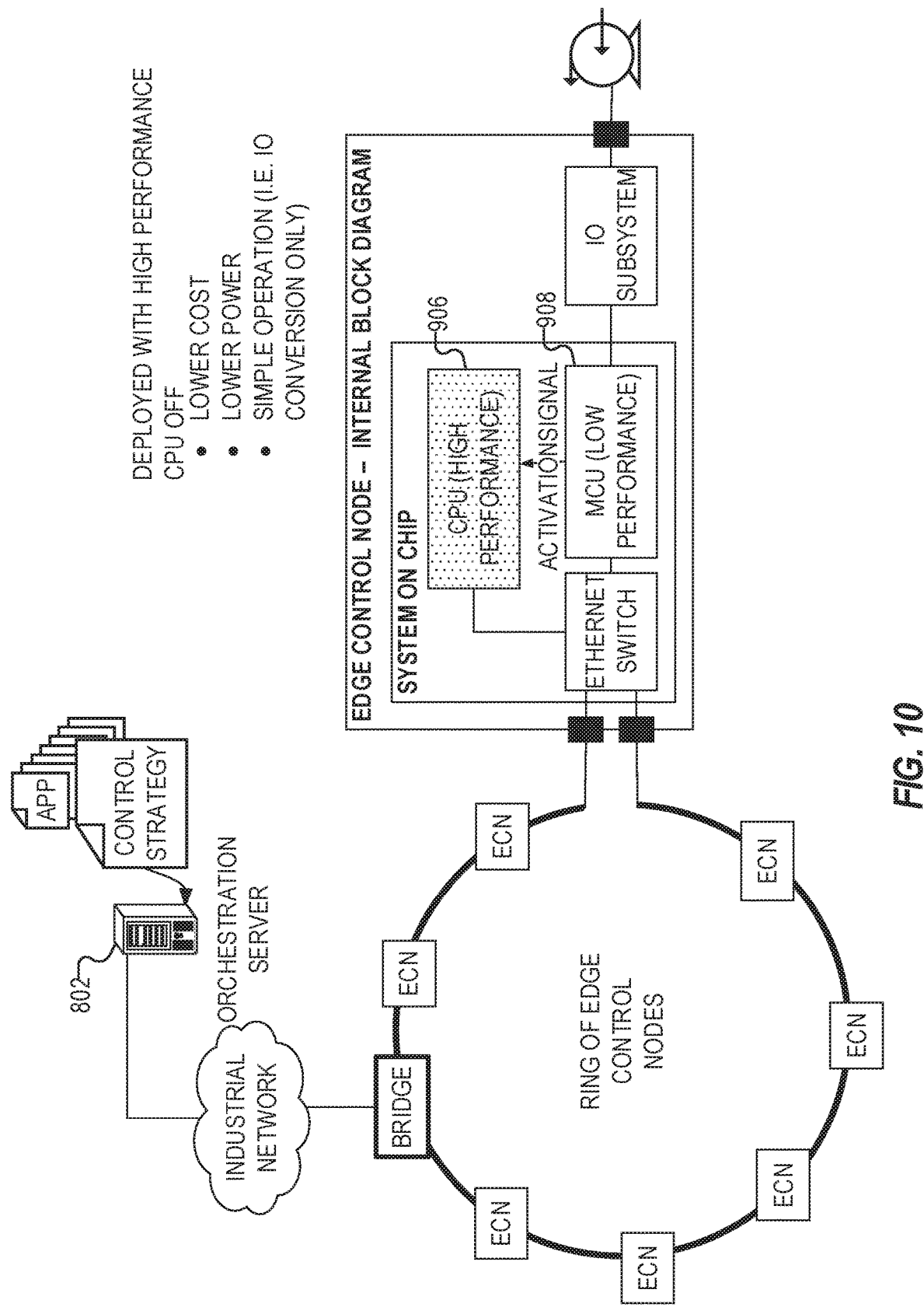
FIG. 10 illustrates an edge control node-based ring topology diagram.

FIG. 10 illustrates an ECN-based ring topology diagram. FIG. 10 shows how a scalable compute ECN may fit into the classic ring topology. FIG. 10 further shows an initial state of deployment, where all high performance CPUs are disabled. As shown in FIG. 10 each ECN has the ability to convert IO to a data bus standard, but no real capability to execute control functions.

In an example, after deployment, the orchestration server 802 may determine how many high performance CPUs are needed, and then send a code to activate one or more CPUs using respective MCUs at particular ECNs. The orchestration server 802 may provide a cost/benefit analysis as part of the scheduling function performed by the orchestration server 802. In an example, a fee may be charged to activate the CPU 906, such as according to a schedule, such as monthly, yearly licenses, or the like. The CPU 906 may be activated or deactivated according to need (e.g., as determined by the orchestrator or the user). The limited license may be cheaper than full deployment. In another example, once activated, the CPU 906 may remain activated indefinitely (e.g., activated permanently for a one-time fee).

In an example, not activating the CPU 906 may reduce thermal output. This may be controlled separately from any fee schedules. For example, once activated, the CPU 906 may be deactivated or moved to a low power state to save on thermal output (even in an example where the CPU 906 was permanently activated). The CPU 906 may execute control instructions in a high power state and move to a low power state when execution is completed.

In an example, an activation code may be a special packet, sent to the MCU 908. The activation code may be evaluated for validity by the MCU 908 including determining how long the code is good for, etc. The MCU 908 may send an activation signal directly to the CPU (e.g., after receiving a signal from an orchestrator).

The MCU 908 may turn on power rails, boot the CPU 906, download latest firmware, etc., when activating the CPU 906 from the inactive state. In an example, the CPU 906 may have a low or high power mode, which may be activated or deactivated instead of turning the CPU 906 off or on. This example may be useful in cases where the CPU 906 is put in a low power state instead of being powered off to reduce thermal output, such as when the CPU 906 may be needed to be activated quickly.

In an example, the low power state may be implemented by providing cryptographic tokens that the orchestrator 802 obtains from the CPU manufacturer. These tokens may be sent to the CPU 906 via the MCU 908. The tokens may, for example, be signed using a key that only the CPU manufacturer and the CPU 906 know (e.g., burned into CPU 906 at manufacture), allowing each token to be validated. Each token may be unique, allowing the CPU 906 to run for some amount of time.

In another example, the tokens are authenticated by the MCU 908 using a secret known to the manufacturer and the MCU 908. For example, as long as the MCU 908 and the CPU 906 are manufactured together in a single package of an SoC. This example may prevent a denial of service attack created by having the CPU 906 woken up to validate the token.

Figure 11:
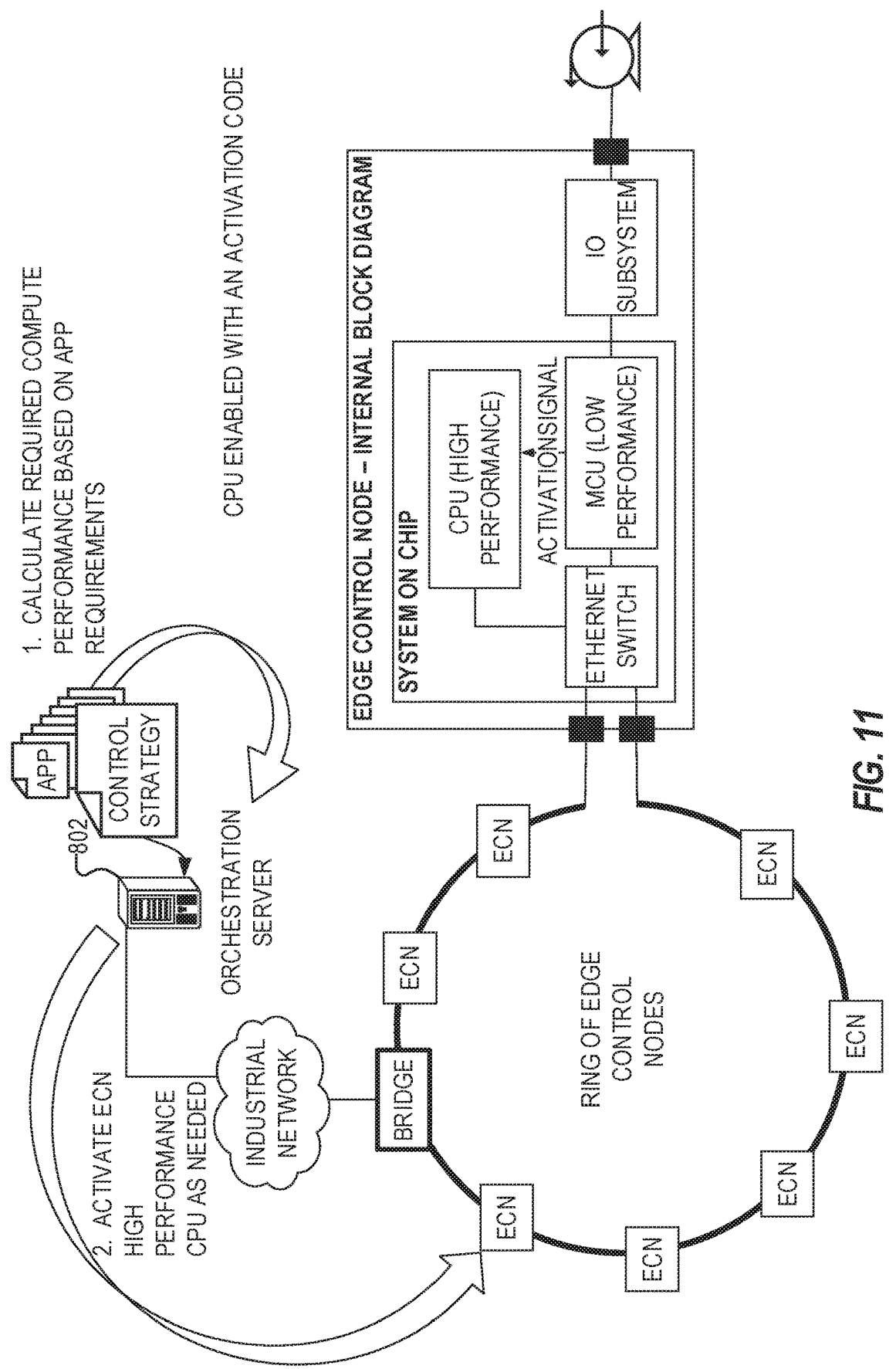
FIG. 11 illustrates data flow through an edge control node-based ring topology.

FIG. 11 illustrates data flow through an ECN-based ring topology. In an example, the orchestration system 802 analyzes the control strategy to understand how much compute is required to satisfy the compute needs of the control strategy. Once the orchestration system has generated the compute requirements, the end user may purchase the required amount of High Performance CPU activation codes from the ECN vendor. The orchestration system 802 will send the authenticated activation codes to specified ECNs in the array of ECNs, which enables the compute resources. This flow is shown in FIG. 11.

The process of enabling compute need not be a one-time event. As the complexity of the control strategy increases and compute demands increase, the end user may continue to purchase and activate more compute resources (or deactivate CPU resources when not needed). For example, the orchestrator may send a deactivation signal to an ECN to deactivate a CPU at that ECN. The ECN vendor may implement a temporal service model, where the end user buys activation licenses on a monthly or yearly basis. This models also allows the end users to let the activation codes expire, allowing some of the compute resources to go back into low power dormant state saving the recurring fees.

Figure 12:
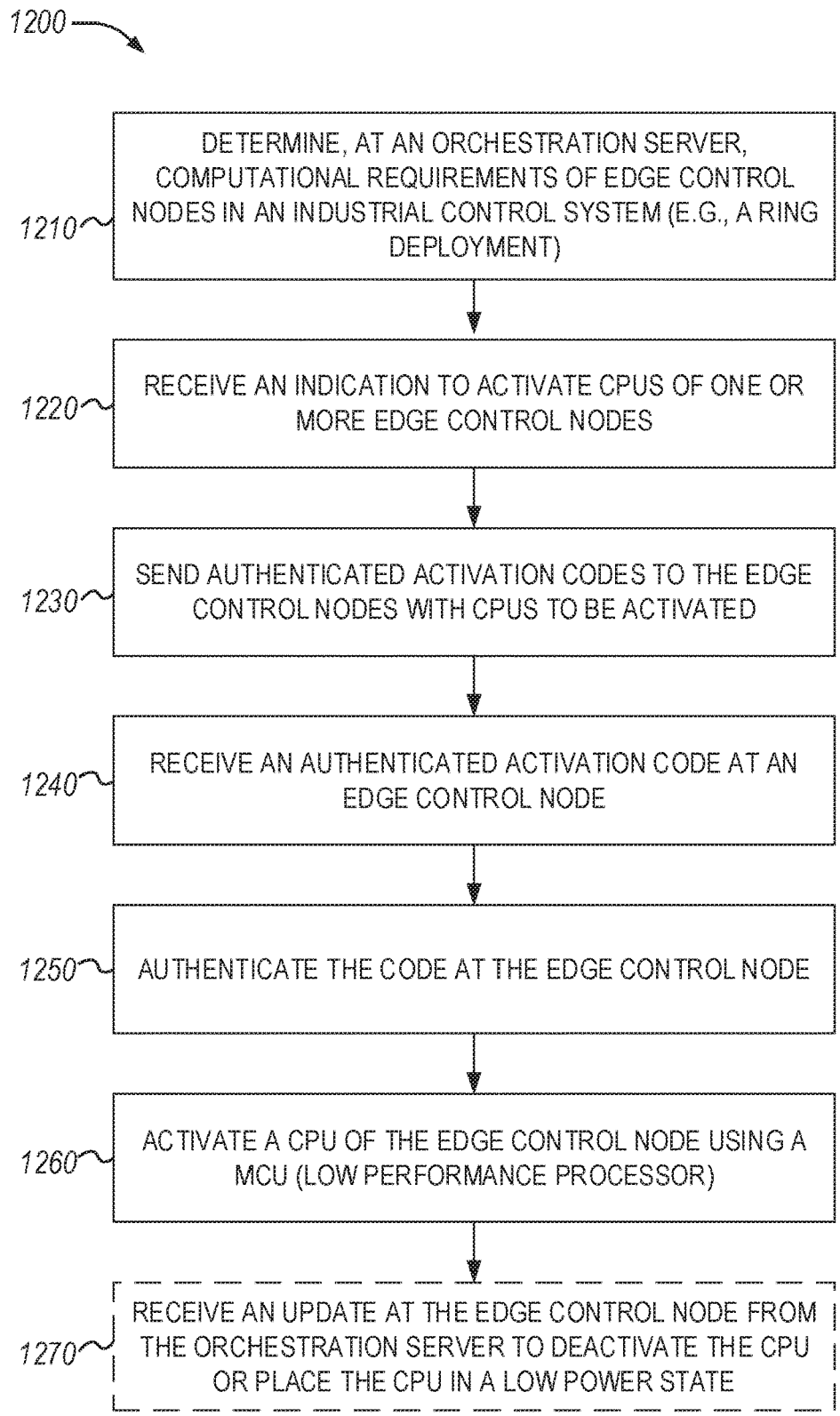
FIG. 12 illustrates a flowchart of a method for activating a processor of an edge control node according to an example.

FIG. 12 illustrates a flowchart 1200 of a method for activating a CPU (e.g., of an ECN) according to an example. Flowchart 1200 includes an operation 1210 to determine, at an orchestration server, computational requirements of edge control nodes in an industrial control system (e.g., a ring deployment). Flowchart 1200 includes an operation 1220 to receive an indication to activate CPUs of one or more edge control nodes or determine that one or more CPUs need to be activated. Flowchart 1200 includes an operation 1230 to send authenticated activation codes to the edge control nodes with CPUs to be activated. In an example, operations 1210-1230 (above) may be performed by the orchestration server, and operations 1240-1270 (below) may be performed by an ECN. A method using the flowchart 1200 may include performing operations 1210-1230 or 1240-1270 or both. Flowchart 1200 includes an operation 1240 to receive an authenticated activation code at an edge control node. Flowchart 1200 includes an operation 1250 to authenticate the code at the edge control node (e.g., at the CPU). Flowchart 1200 includes an operation 1260 to activate a CPU of the edge control node using a MCU (low performance processor). Flowchart 1200 includes an optional operation 1270 to receive an update at the edge control node from the orchestration server to deactivate the CPU or place the CPU in a low power state. In an example, the ECN may be part of a ring network of an industrial control system.

Figure 13:
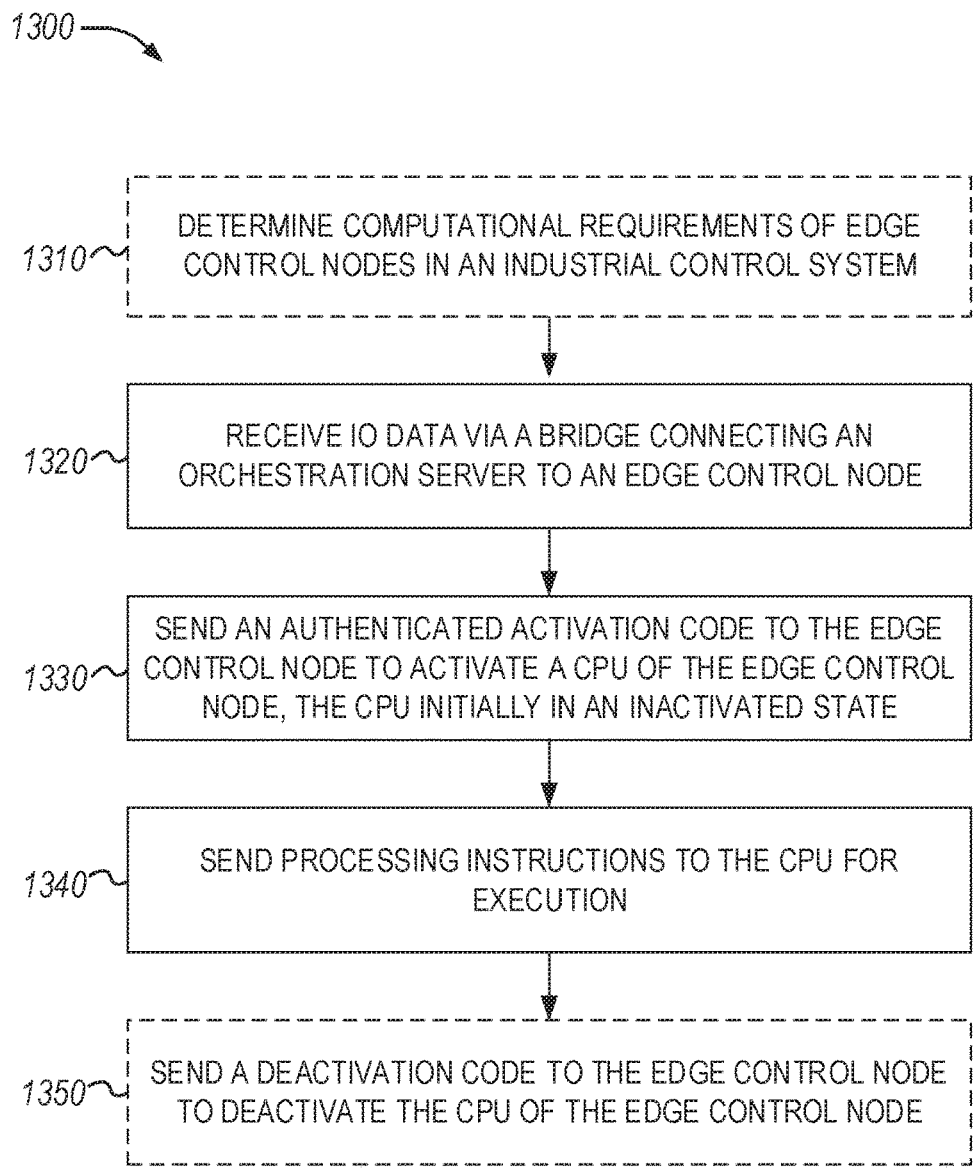
FIG. 13 illustrates a flowchart of a method for activating a CPU according to an example.

FIG. 13 illustrates a flowchart 1300 of a method for activating a CPU according to an example. The operations of flowchart 1300 may be performed by an orchestration server. The orchestration server may be communicatively coupled to a ring network of edge control nodes, such as via a bridge device.

The flowchart 1300 includes an optional operation 1310 to determine computational requirements of edge control nodes in an industrial control system. In an example, the edge control nodes may be nodes in a ring topology network with a bridge device connecting the network to the orchestration server.

The flowchart 1300 includes an operation 1320 to receive IO data via a bridge connecting an orchestration server to an edge control node. The IO data may be converted at a microcontroller (MCU) of the edge control node from data generated at an IO subsystem. The conversion may be to a packet sent by an Ethernet switch of a system on a chip of the edge control node (which may include the MCU as well). In another example, the data converted by the MCU may be data generated by the MCU itself, such as a power state of the field device or the edge control node.

The flowchart 1300 includes an operation 1330 to send an authenticated activation code to the edge control node to activate a CPU of the edge control node, with this CPU initially in an inactivated state. In an example, the authenticated activation code is authenticated by the MCU before the CPU is activated.

The flowchart 1300 includes an operation 1340 to send processing instructions to the CPU for execution.

The flowchart 1300 includes an optional operation 1350 to send a deactivation code to the edge control node to deactivate the CPU of the edge control node.

The method may include an operation to determine computational requirements of edge control nodes in an industrial control system including the edge control node. In an example, the CPU is activated based on a determination by the orchestration server that the CPU is to be activated to satisfy a control strategy for the industrial control system. In another example, the orchestration server may receive an indication to activate the CPU of the edge control node of the edge control nodes.

IoT Devices and Networks

The techniques described above may be implemented in connection with a variety of device deployments, including in those of any number of IoT networks and topologies. Accordingly, it will be understood that various embodiments of the present techniques may involve the coordination of edge devices, the fog and intermediary devices, and cloud entities among heterogeneous and homogeneous networks. Some of the example topologies and arrangements of such networks are provided in the following paragraphs.

Figure 14:
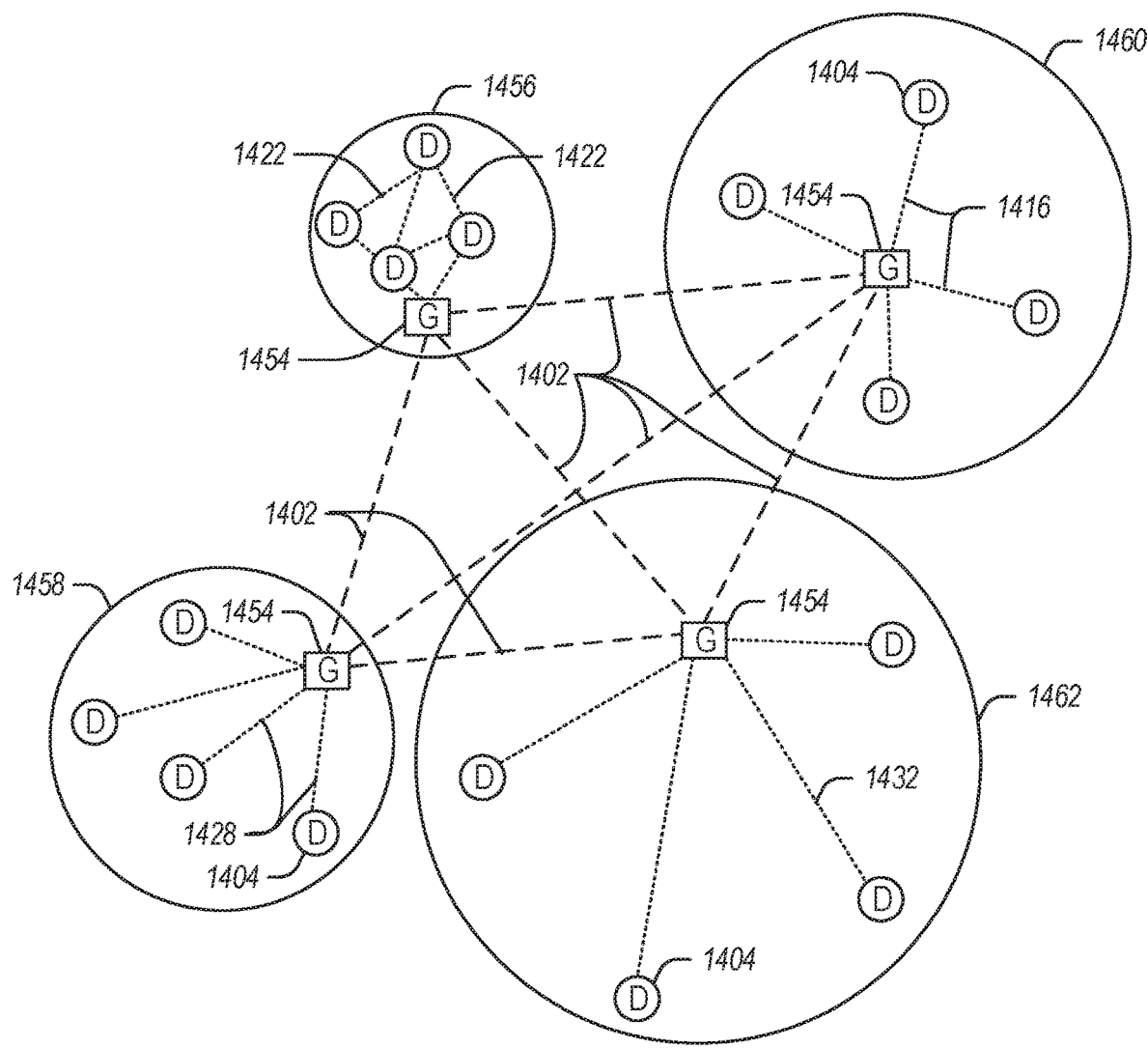
FIG. 14 illustrates a domain topology for respective internet-of-things (IoT) networks coupled through links to respective gateways, according to an example.

FIG. 14 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

IoT devices are physical objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in the system examples discussed above, present a number of new challenges in a heterogeneous network of connectivity comprising a combination of wired and wireless technologies.

FIG. 14 specifically provides a simplified drawing of a domain topology that may be used for a number of internet-of-things (IoT) networks comprising IoT devices 1404, with the IoT networks 1456, 1458, 1460, 1462, coupled through backbone links 1402 to respective gateways 1454. For example, a number of IoT devices 1404 may communicate with a gateway 1454, and with each other through the gateway 1454. To simplify the drawing, not every IoT device 1404, or communications link (e.g., link 1416, 1422, 1428, or 1432) is labeled. The backbone links 1402 may include any number of wired or wireless technologies, including optical networks, and may be part of a local area network (LAN), a wide area network (WAN), or the Internet. Additionally, such communication links facilitate optical signal paths among both IoT devices 1404 and gateways 1454, including the use of MUXing/deMUXing components that facilitate interconnection of the various devices.

The network topology may include any number of types of IoT networks, such as a mesh network provided with the network 1456 using Bluetooth low energy (BLE) links 1422. Other types of IoT networks that may be present include a wireless local area network (WLAN) network 1458 used to communicate with IoT devices 1404 through IEEE 802.11 (Wi-Fi®) links 1428, a cellular network 1460 used to communicate with IoT devices 1404 through an LTE/LTE-A (4G) or 5G cellular network, and a low-power wide area (LPWA) network 1462, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1404, such as over the backbone links 1402, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 1456, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1458, for instance, may use systems that perform standards conversion to provide multi-standard connectivity, enabling IoT devices 1404 using different protocols to communicate. Further systems may provide seamless interconnectivity across a multi-standard infrastructure comprising visible Internet resources and hidden Internet resources.

Communications in the cellular network 1460, for instance, may be enhanced by systems that offload data, extend communications to more remote devices, or both. The LPWA network 1462 may include systems that perform non-Internet protocol (IP) to IP interconnections, addressing, and routing. Further, each of the IoT devices 1404 may include the appropriate transceiver for wide area communications with that device. Further, each IoT device 1404 may include other transceivers for communications using additional protocols and frequencies. This is discussed further with respect to the communication environment and hardware of an IoT processing device depicted in FIGS. 16 and 17.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 15 below.

Figure 15:
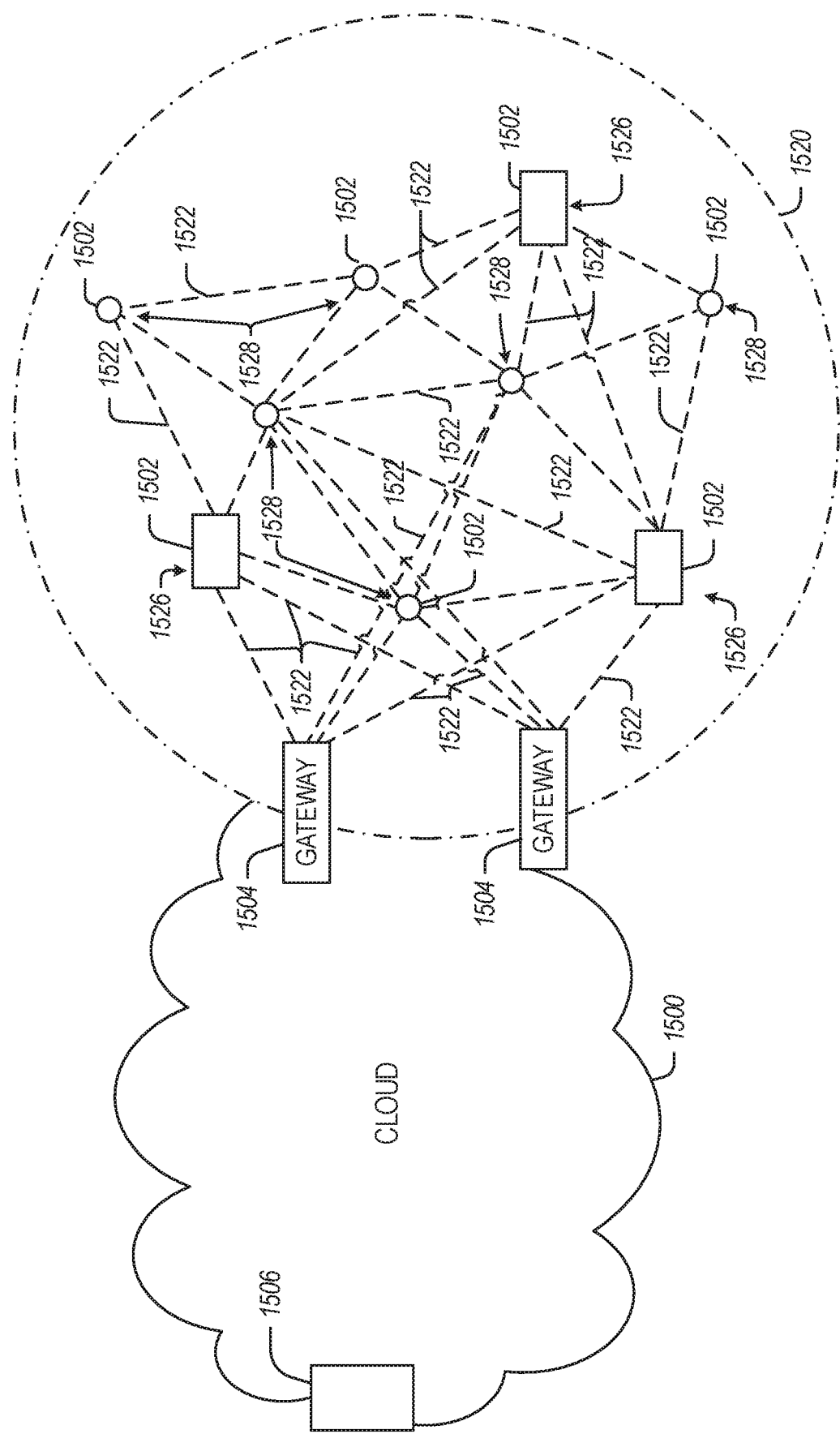
FIG. 15 illustrates a cloud computing network in communication with a mesh network of IoT devices operating as a fog device at the edge of the cloud computing network, according to an example.

FIG. 15 illustrates a cloud computing network in communication with a mesh network of IoT devices (devices 1502) operating as a fog device at the edge of the cloud computing network. The mesh network of IoT devices may be termed a fog 1520, operating at the edge of the cloud 1500. To simplify the diagram, not every IoT device 1502 is labeled.

The fog 1520 may be considered to be a massively interconnected network wherein a number of IoT devices 1502 are in communications with each other, for example, by radio links 1522. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.-.M.A.N.) routing protocol, or the OMA Lightweight M2M (LWM2M) protocol, among others.

Three types of IoT devices 1502 are shown in this example, gateways 1504, data aggregators 1526, and sensors 1528, although any combinations of IoT devices 1502 and functionality may be used. The gateways 1504 may be edge devices that provide communications between the cloud 1500 and the fog 1520, and may also provide the backend process function for data obtained from sensors 1528, such as motion data, flow data, temperature data, and the like. The data aggregators 1526 may collect data from any number of the sensors 1528, and perform the processing function for the analysis. The results, raw data, or both may be passed along to the cloud 1500 through the gateways 1504. The sensors 1528 may be full IoT devices 1502, for example, capable of both collecting data and processing the data. In some cases, the sensors 1528 may be more limited in functionality, for example, collecting the data and allowing the data aggregators 1526 or gateways 1504 to process the data.

Communications from any IoT device 1502 may be passed along a convenient path (e.g., a most convenient path) between any of the IoT devices 1502 to reach the gateways 1504. In these networks, the number of interconnections provide substantial redundancy, allowing communications to be maintained, even with the loss of a number of IoT devices 1502. Further, the use of a mesh network may allow IoT devices 1502 that are very low power or located at a distance from infrastructure to be used, as the range to connect to another IoT device 1502 may be much less than the range to connect to the gateways 1504.

The fog 1520 provided from these IoT devices 1502 may be presented to devices in the cloud 1500, such as a server 1506, as a single device located at the edge of the cloud 1500, e.g., a fog device. In this example, the alerts coming from the fog device may be sent without being identified as coming from a specific IoT device 1502 within the fog 1520. In this fashion, the fog 1520 may be considered a distributed platform that provides computing and storage resources to perform processing or data-intensive tasks such as data analytics, data aggregation, and machine-learning, among others.

In some examples, the IoT devices 1502 may be configured using an imperative programming style, e.g., with each IoT device 1502 having a specific function and communication partners. However, the IoT devices 1502 forming the fog device may be configured in a declarative programming style, allowing the IoT devices 1502 to reconfigure their operations and communications, such as to determine needed resources in response to conditions, queries, and device failures. As an example, a query from a user located at a server 1506 about the operations of a subset of equipment monitored by the IoT devices 1502 may result in the fog 1520 device selecting the IoT devices 1502, such as particular sensors 1528, needed to answer the query. The data from these sensors 1528 may then be aggregated and analyzed by any combination of the sensors 1528, data aggregators 1526, or gateways 1504, before being sent on by the fog 1520 device to the server 1506 to answer the query. In this example, IoT devices 1502 in the fog 1520 may select the sensors 1528 used based on the query, such as adding data from flow sensors or temperature sensors. Further, if some of the IoT devices 1502 are not operational, other IoT devices 1502 in the fog 1520 device may provide analogous data, if available.

In an example, the various aspects of workload orchestration and operations may be adapted to the various network topologies and approaches depicted in FIG. 15. For example, a system may establish a variety of workloads executing in the cloud 1500 in coordination with the IoT devices 1502. These workloads could be orchestrated in the cloud 1500 or fog 1520 from the edge (e.g., from IoT devices 1502), or such workloads may be orchestrated on the edge by the cloud 1500 or the fog 1520. Such concepts may also apply to gateways 1504 and data aggregators 1526 and other devices and nodes within the network topology.

In other examples, the operations and functionality described above with reference to the systems described above may be embodied by an IoT device machine in the example form of an electronic processing system, within which a set or sequence of instructions may be executed to cause the electronic processing system to perform any one of the methodologies discussed herein, according to an example. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 16:
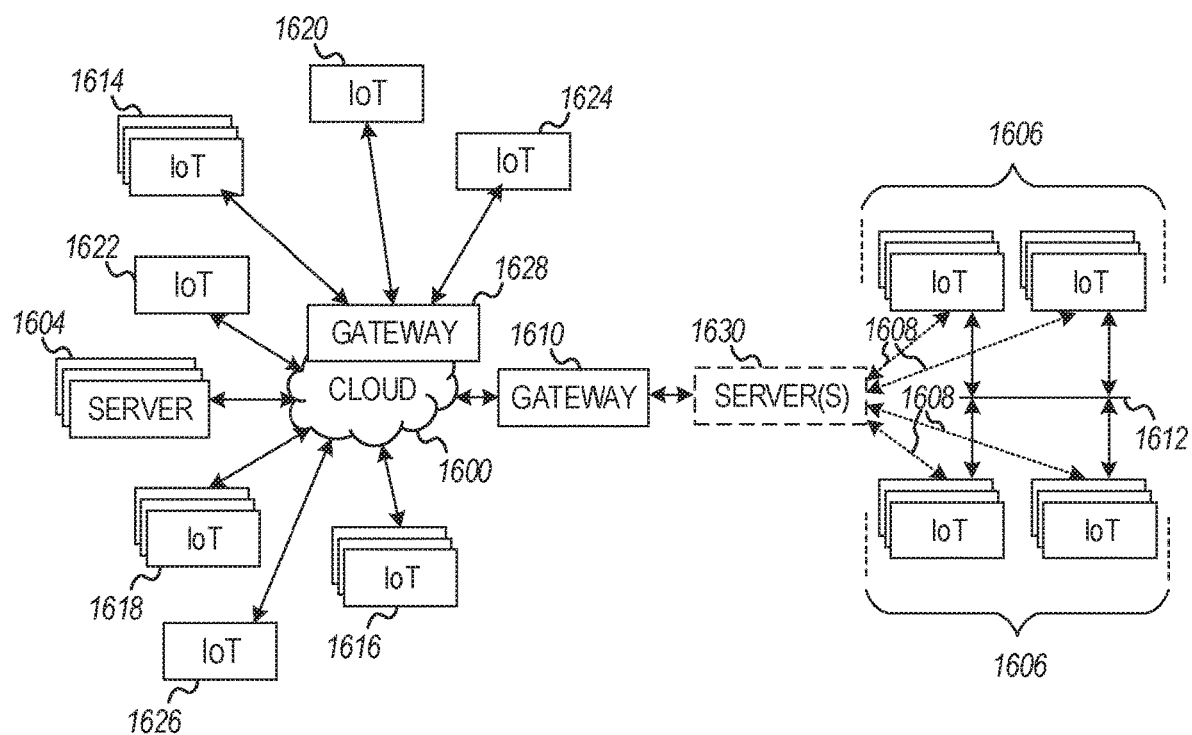
FIG. 16 illustrates a block diagram of a network illustrating communications among a number of IoT devices, according to an example.

FIG. 16 illustrates a drawing of a cloud computing network, or cloud 1600, in communication with a number of Internet of Things (IoT) devices. The cloud 1600 may represent the Internet, or may be a local area network (LAN), or a wide area network (WAN), such as a proprietary network for a company. The IoT devices may include any number of different types of devices, grouped in various combinations. For example, a traffic control group 1606 may include IoT devices along streets in a city. These IoT devices may include stoplights, traffic flow monitors, cameras, weather sensors, and the like. The traffic control group 1606, or other subgroups, may be in communication with the cloud 1600 through wired or wireless links 1608, such as LPWA links, optical links, and the like. Further, a wired or wireless sub-network 1612 may allow the IoT devices to communicate with each other, such as through a local area network, a wireless local area network, and the like. The IoT devices may use another device, such as a gateway 1610 or 1628 to communicate with remote locations such as the cloud 1600; the IoT devices may also use one or more servers 1630 to facilitate communication with the cloud 1600 or with the gateway 1610. For example, the one or more servers 1630 may operate as an intermediate network node to support a local edge cloud or fog implementation among a local area network. Further, the gateway 1628 that is depicted may operate in a cloud-to-gateway-to-many edge devices configuration, such as with the various IoT devices 1614, 1620, 1624 being constrained or dynamic to an assignment and use of resources in the cloud 1600.

Other example groups of IoT devices may include remote weather stations 1614, local information terminals 1616, alarm systems 1618, automated teller machines 1620, alarm panels 1622, or moving vehicles, such as emergency vehicles 1624 or other vehicles 1626, among many others. Each of these IoT devices may be in communication with other IoT devices, with servers 1604, with another IoT fog device or system (not shown, but depicted in FIG. 15), or a combination therein. The groups of IoT devices may be deployed in various residential, commercial, and industrial settings (including in both private or public environments).

As may be seen from FIG. 16, a large number of IoT devices may be communicating through the cloud 1600. This may allow different IoT devices to request or provide information to other devices autonomously. For example, a group of IoT devices (e.g., the traffic control group 1606) may request a current weather forecast from a group of remote weather stations 1614, which may provide the forecast without human intervention. Further, an emergency vehicle 1624 may be alerted by an automated teller machine 1620 that a burglary is in progress. As the emergency vehicle 1624 proceeds towards the automated teller machine 1620, it may access the traffic control group 1606 to request clearance to the location, for example, by lights turning red to block cross traffic at an intersection in sufficient time for the emergency vehicle 1624 to have unimpeded access to the intersection.

Clusters of IoT devices, such as the remote weather stations 1614 or the traffic control group 1606, may be equipped to communicate with other IoT devices as well as with the cloud 1600. This may allow the IoT devices to form an ad-hoc network between the devices, allowing them to function as a single device, which may be termed a fog device or system (e.g., as described above with reference to FIG. 15).

Figure 17:
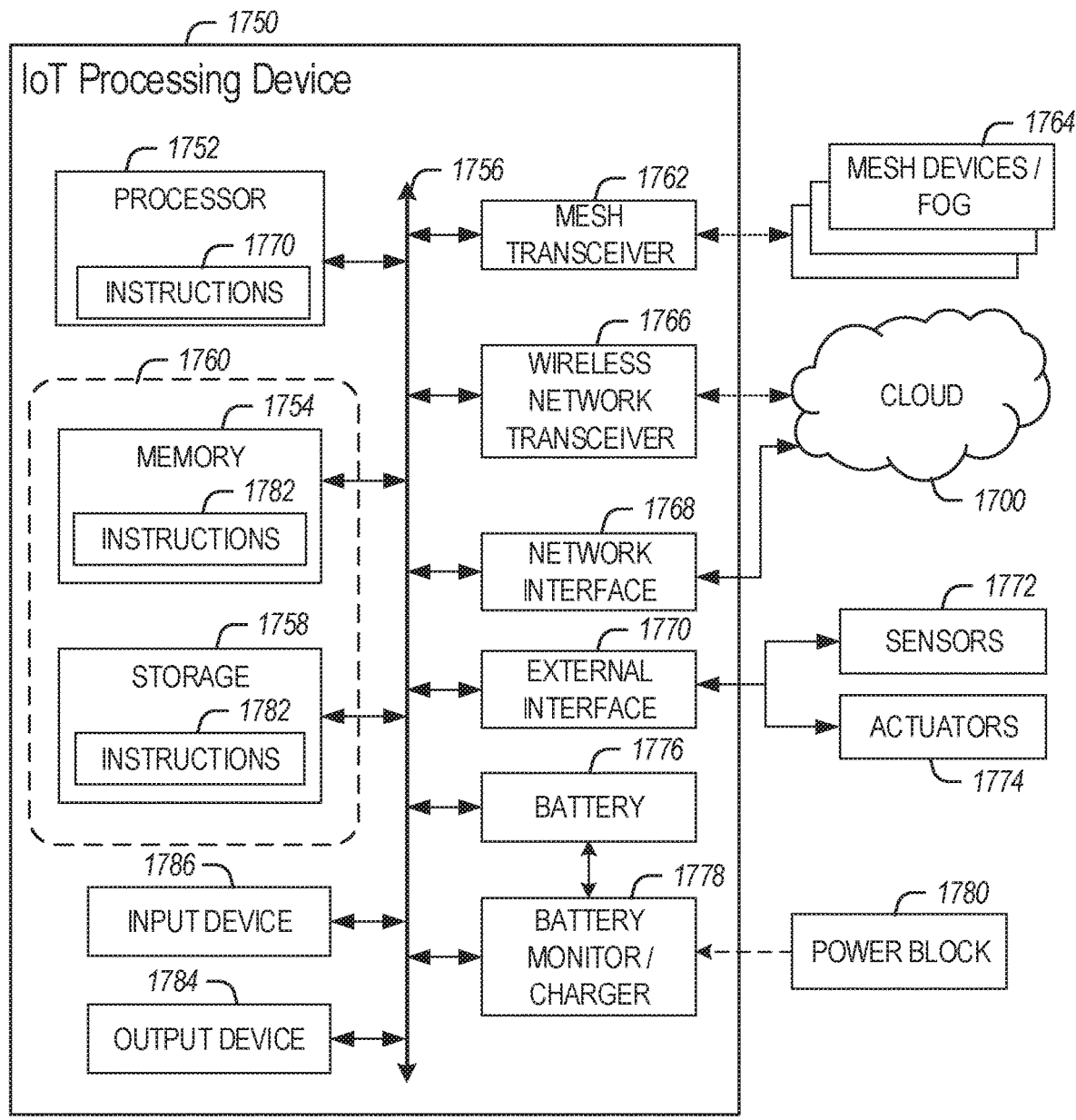
FIG. 17 illustrates a block diagram for an example IoT processing system architecture upon which any one or more of the techniques (e.g., operations, processes, methods, and methodologies) discussed herein may be performed.

FIG. 17 is a block diagram of an example of components that may be present in an IoT device 1750 for implementing the techniques described herein. The IoT device 1750 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1750, or as components otherwise incorporated within a chassis of a larger system. Additionally, the block diagram of FIG. 17 is intended to depict a high-level view of components of the IoT device 1750. However, some of the components shown may be omitted, additional components may be present, and different arrangement of the components shown may occur in other implementations.

The IoT device 1750 may include a processor 1752, which may be a microprocessor, a multi-core processor, a multithreaded processor, an ultra-low voltage processor, an embedded processor, or other known processing element. The processor 1752 may be a part of a system on a chip (SoC) in which the processor 1752 and other components are formed into a single integrated circuit, or a single package, such as the Edison™ or Galileo™ SoC boards from Intel. As an example, the processor 1752 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1752 may communicate with a system memory 1754 over an interconnect 1756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1758 may also couple to the processor 1752 via the interconnect 1756. In an example the storage 1758 may be implemented via a solid state disk drive (SSDD). Other devices that may be used for the storage 1758 include flash memory cards, such as SD cards, microSD cards, xD picture cards, and the like, and USB flash drives. In low power implementations, the storage 1758 may be on-die memory or registers associated with the processor 1752. However, in some examples, the storage 1758 may be implemented using a micro hard disk drive (HDD). Further, any number of new technologies may be used for the storage 1758 in addition to, or instead of, the technologies described, such resistance change memories, phase change memories, holographic memories, or chemical memories, among others.

The components may communicate over the interconnect 1756. The interconnect 1756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1756 may be a proprietary bus, for example, used in a SoC based system. Other bus systems may be included, such as an I2C interface, an SPI interface, point to point interfaces, and a power bus, among others.

The interconnect 1756 may couple the processor 1752 to a mesh transceiver 1762, for communications with other mesh devices 1764. The mesh transceiver 1762 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1764. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1762 may communicate using multiple standards or radios for communications at different range. For example, the IoT device 1750 may communicate with close devices, e.g., within about 10 meters, using a local transceiver based on BLE, or another low power radio, to save power. More distant mesh devices 1764, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1766 may be included to communicate with devices or services in the cloud 1700 via local or wide area network protocols. The wireless network transceiver 1766 may be a LPWA transceiver that follows the IEEE 802.15.4, or IEEE 802.15.4g standards, among others. The IoT device 1750 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as timeslotted channel hopping, described in the IEEE 802.15.4e specification may be used.

Any number of other radio communications and protocols may be used in addition to the systems mentioned for the mesh transceiver 1762 and wireless network transceiver 1766, as described herein. For example, the radio transceivers 1762 and 1766 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1762 and 1766 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1766, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1768 may be included to provide a wired communication to the cloud 1700 or to other devices, such as the mesh devices 1764. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1768 may be included to allow connect to a second network, for example, a NIC 1768 providing communications to the cloud over Ethernet, and a second NIC 1768 providing communications to other devices over another type of network.

The interconnect 1756 may couple the processor 1752 to an external interface 1770 that is used to connect external devices or subsystems. The external devices may include sensors 1772, such as accelerometers, level sensors, flow sensors, optical light sensors, camera sensors, temperature sensors, a global positioning system (GPS) sensors, pressure sensors, barometric pressure sensors, and the like. The external interface 1770 further may be used to connect the IoT device 1750 to actuators 1774, such as power switches, valve actuators, an audible sound generator, a visual warning device, and the like.

In some optional examples, various input/output (I/O) devices may be present within, or connected to, the IoT device 1750. For example, a display or other output device 1784 may be included to show information, such as sensor readings or actuator position. An input device 1786, such as a touch screen or keypad may be included to accept input. An output device 1784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1750.

A battery 1776 may power the IoT device 1750, although in examples in which the IoT device 1750 is mounted in a fixed location, it may have a power supply coupled to an electrical grid. The battery 1776 may be a lithium ion battery, or a metal-air battery, such as a zinc-air battery, an aluminum-air battery, a lithium-air battery, and the like.

A battery monitor/charger 1778 may be included in the IoT device 1750 to track the state of charge (SoCh) of the battery 1776. The battery monitor/charger 1778 may be used to monitor other parameters of the battery 1776 to provide failure predictions, such as the state of health (SoH) and the state of function (SoF) of the battery 1776. The battery monitor/charger 1778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1778 may communicate the information on the battery 1776 to the processor 1752 over the interconnect 1756. The battery monitor/charger 1778 may also include an analog-to-digital (ADC) convertor that allows the processor 1752 to directly monitor the voltage of the battery 1776 or the current flow from the battery 1776. The battery parameters may be used to determine actions that the IoT device 1750 may perform, such as transmission frequency, mesh network operation, sensing frequency, and the like.

A power block 1780, or other power supply coupled to a grid, may be coupled with the battery monitor/charger 1778 to charge the battery 1776. In some examples, the power block 1780 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1778. The specific charging circuits chosen depend on the size of the battery 1776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1758 may include instructions 1782 in the form of software, firmware, or hardware commands to implement the techniques described herein. Although such instructions 1782 are shown as code blocks included in the memory 1754 and the storage 1758, it may be understood that any of the code blocks may be replaced with hardwired circuits, for example, built into an application specific integrated circuit (ASIC).

In an example, the instructions 1782 provided via the memory 1754, the storage 1758, or the processor 1752 may be embodied as a non-transitory, machine readable medium 1760 including code to direct the processor 1752 to perform electronic operations in the IoT device 1750. The processor 1752 may access the non-transitory, machine readable medium 1760 over the interconnect 1756. For instance, the non-transitory, machine readable medium 1760 may be embodied by devices described for the storage 1758 of FIG. 17 or may include specific storage units such as optical disks, flash drives, or any number of other hardware devices. The non-transitory, machine readable medium 1760 may include instructions to direct the processor 1752 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an edge control node of an industrial control system comprising: an IO subsystem for receiving data from a field device; and a system on a chip including: an ethernet switch communicatively coupled to a network; a microcontroller (MCU) to convert IO data from the IO subsystem and send the data via the ethernet switch to an orchestration server via the network; and a central processing unit (CPU) initially in an inactive state to: receive an activation signal from the orchestration server via the ethernet switch; and change to an activated state in response to receiving the activation signal.

In Example 2, the subject matter of Example 1 includes, the activated state of the CPU including a low power mode and a high power mode.

In Example 3, the subject matter of Examples 1-2 includes, wherein the CPU is further to receive a deactivation signal from the orchestration server after a period of time in the activated state, and in response, return to the inactive state.

In Example 4, the subject matter of Examples 1-3 includes, wherein the edge control node is one of a plurality of edge control nodes in the industrial control system, the plurality of edge control nodes including at least one edge control node with an inactive CPU after the CPU is activated.

In Example 5, the subject matter of Examples 1-4 includes, wherein the CPU is activated based on a determination by the orchestration server that the CPU is to be activated to satisfy a control strategy for the industrial control system.

In Example 6, the subject matter of Examples 1-5 includes, wherein the ethernet switch is a time-sensitive networking ethernet switch.

In Example 7, the subject matter of Examples 1-6 includes, wherein the network has a ring topology with a bridge device connecting the network to the orchestration server.

In Example 8, the subject matter of Examples 1-7 includes, wherein the activation signal is received at the CPU directly from the MCU.

In Example 9, the subject matter of Examples 1-8 includes, wherein the CPU is further to receive processing instructions from the orchestration server, the CPU to execute the processing instructions when in the activated state.

Example 10 is a method comprising: receiving IO data, using a processor of an orchestration server, via a bridge connecting the orchestration server to an edge control node, the IO data converted at a microcontroller of the edge control node from data generated at an IO subsystem to a packet sent by an ethernet switch; sending an authenticated activation code to the edge control node to activate a CPU of the edge control node, the CPU initially in an inactivated state; and sending processing instructions to the CPU for execution.

In Example 11, the subject matter of Example 10 includes, determining, at the orchestration server, computational requirements of edge control nodes in an industrial control system including the edge control node, wherein the CPU is activated based on a determination by the orchestration server that the CPU is to be activated to satisfy a control strategy for the industrial control system.

In Example 12, the subject matter of Examples 10-11 includes, receiving, at the orchestration server, an indication to activate a CPU of an edge control node of the edge control nodes.

In Example 13, the subject matter of Examples 10-12 includes, wherein the authenticated activation code is authenticated by the MCU before the CPU is activated.

In Example 14, the subject matter of Examples 10-13 includes, sending a deactivation code, from the orchestration server, to the CPU to deactivate the CPU.

In Example 15, the subject matter of Examples 10-14 includes, wherein the edge control node is a node in a ring topology network with a bridge device connecting the network to the orchestration server.

Example 16 is an industrial control system comprising: a ring network including a plurality of edge control nodes; an orchestration server; a bridge connecting the orchestration server to the ring network; and wherein the plurality of edge control nodes includes, a first edge control node comprising: a system on a chip including: a microcontroller (MCU) to convert IO data from an IO subsystem and send the data via an ethernet switch to the orchestration server via the bridge; and a central processing unit (CPU) in an initial inactive state to: receive an activation signal from the orchestration server; and change to an activated state in response to receiving the activation signal.

In Example 17, the subject matter of Example 16 includes, wherein the CPU is further to receive a deactivation signal from the orchestration server after a period of time in the activated state, and in response, return to the inactive state.

In Example 18, the subject matter of Examples 16-17 includes, wherein the CPU is activated based on a determination by the orchestration server that the CPU is to be activated to satisfy a control strategy for the industrial control system.

In Example 19, the subject matter of Examples 16-18 includes, wherein the activation signal is received at the CPU directly from the MCU.

In Example 20, the subject matter of Examples 16-19 includes, wherein the plurality of edge control nodes includes a second edge node with a CPU remaining in an inactive state after the CPU of the first edge control node is activated.

In Example 21, the subject matter of Examples 16-20 includes, wherein the orchestration server is further to send processing instructions to the CPU for execution.

Example 22 is at least one machine-readable medium including instructions that, when executed by processing circuitry, cause the processing circuitry to perform operations to implement of any of Examples 1-21.

Example 23 is at least one machine-readable medium including instructions, which when executed by a processor of an orchestration server, cause the processor to perform operations to: receive input/output (IO) data, the IO data received via a bridge connecting the orchestration server to an edge control node, wherein the IO data is converted at a microcontroller (MCU) of the edge control node from data generated at an IO subsystem to a packet sent by a networking component; send an authenticated activation code to the edge control node to activate a central processing unit (CPU) of the edge control node, wherein the CPU is initially placed in an inactivated state; and send processing instructions to the CPU for execution.

In Example 24, the subject matter of Example 23 includes, wherein the operations further cause the processor to determine computational requirements of edge control nodes in an industrial control system including the edge control node, and wherein the CPU is activated based on a determination by the orchestration server that activating the CPU satisfies a control strategy for the industrial control system.

In Example 25, the subject matter of Examples 23-24 includes, wherein the operations further cause the processor to receive an indication to activate the CPU of the edge control node in the industrial control system.

In Example 26, the subject matter of Examples 23-25 includes, wherein the authenticated activation code is authenticated by the MCU before the CPU is activated.

In Example 27, the subject matter of Examples 23-26 includes, wherein the operations further cause the processor to send a deactivation code, from the orchestration server, to the CPU to deactivate the CPU.

In Example 28, the subject matter of Examples 23-27 includes, wherein the edge control node is a node in a ring topology network with a bridge device connecting the network to the orchestration server.

Example 29 is an apparatus comprising means to implement of any of Examples 1-28.

Example 30 is a system to implement of any of Examples 1-28.

Example 31 is a method to implement of any of Examples 1-28.

Example 32 is at least one machine readable medium including instructions, which when executed by a computing system, cause the computing system to perform any of the operations of Examples 1-28.

Example 33 is an apparatus comprising respective means for performing any of operations of Examples 1-28.

Example 34 is a software defined industrial system, comprising respective devices and respective circuitry in the respective devices, with the respective circuitry configured to perform the operations of any of operations of Examples 1-28.

Example 35 is an apparatus, comprising circuitry configured to perform the operations of any of the operations of Examples 1-28.

In Example 36, the subject matter of Example 35 includes, wherein the apparatus is a gateway enabling connection to adapted plurality of field devices, other device networks, or other network deployments.

In Example 37, the subject matter of Examples 35-36 includes, wherein the apparatus is a device operably coupled to at least one sensor and at least one actuator.

In Example 38, the subject matter of Examples 35-37 includes, wherein the apparatus is an Edge Control Node device adapted for connection to a plurality of field devices.

In Example 39, the subject matter of Examples 35-38 includes, wherein the apparatus is an Intelligent I/O Controller device adapted for connection to a plurality of field devices.

In Example 40, the subject matter of Examples 35-39 includes, wherein the apparatus is a Basic I/O Controller device adapted for connection to a plurality of field devices.

In Example 41, the subject matter of Examples 35-40 includes, wherein the apparatus is a control server computing system adapted for connection to a plurality of networked systems.

In Example 42, the subject matter of Examples 35-41 includes, wherein the apparatus is a control processing node computing system adapted for connection to a plurality of networked systems.

Example 43 is a networked system, comprising respective devices connected within a fog or cloud network topology, the respective devices comprising circuitry configured to perform the operations of any of Examples 1-28.

In Example 44, the subject matter of Example 43 includes, wherein the respective devices are connected via a real-time service bus.

In Example 45, the subject matter of Examples 43-44 includes, wherein the network topology includes controller, storage, and compute functionality for the software defined industrial system via a redundant pair of hosts.

In Example 4460, the subject matter of Examples 43-45 includes, wherein the network topology includes controller, storage, and compute functionalities for the software defined industrial system via separate physical hosts.

Example 47 is a method for determining computational requirements of edge control nodes in an industrial control system (e.g., a ring deployment), such as at an orchestration server, receiving an indication to activate CPUs of one or more edge control nodes, and sending authenticated activation codes to the edge control nodes with CPUs to be activated.

Example 48 is a method for receiving an authenticated activation code at an edge control node, authenticating the code at the edge control node, and activating a CPU of the edge control node using a microprocessor (MCU) (e.g., a low performance processor).

In Example 49, the subject matter of Examples 47-48 includes: performing Examples 47-48 at a ring deployment of edge control nodes arranged by an orchestration system of an industrial control system.

In Example 50, the subject matter of Example 48 includes: receiving an update at the edge control node from the orchestration server to deactivate the CPU or place the CPU in a low power state.

What is claimed is:

1. An edge control node of an industrial control system comprising:
    an input/output (IO) subsystem for receiving a signal from a field device and generating IO data; and
    a system on a chip including:
        a networking component communicatively coupled to a network;
        a microcontroller (MCU) to convert the IO data from the IO subsystem and send the converted data via the networking component to an orchestration server via the network; and
        a central processing unit (CPU) initially in an inactive state to change to an activated state in response to an activation signal being received at the edge control node from the orchestration server via the networking component.

2. The edge control node of claim 1, wherein the activated state of the CPU includes a low power mode and a high power mode.

3. The edge control node of claim 1, wherein the CPU is further configured to receive a deactivation signal from the orchestration server after a period of time in the activated state, and in response, return to the inactive state.

4. The edge control node of claim 1, wherein the edge control node is one of a plurality of edge control nodes in the industrial control system, the plurality of edge control nodes including at least one edge control node with an inactive CPU after the CPU is activated.

5. The edge control node of claim 1, wherein the CPU is activated based on a determination by the orchestration server that the CPU is to be activated to satisfy a control strategy for the industrial control system.

6. The edge control node of claim 1, wherein the networking component is a time-sensitive networking ethernet switch.

7. The edge control node of claim 1, wherein the network has a ring topology with a bridge device connecting the network to the orchestration server.

8. The edge control node of claim 1, wherein the activation signal is received at the CPU directly from the MCU.

9. The edge control node of claim 1, wherein the CPU is further to receive processing instructions from the orchestration server, the CPU to execute the processing instructions when in the activated state.

10. At least one non-transitory machine-readable medium including instructions, which when executed by a processor of an orchestration server, cause the processor to perform operations to:
    receive input/output (IO) data, the IO data received via a bridge connecting the orchestration server to an edge control node, wherein the IO data is converted at a microcontroller (MCU) of the edge control node from data generated at an IO subsystem to a packet sent by a networking component;
    send an authenticated activation code to the edge control node to activate a central processing unit (CPU) of the edge control node, wherein the CPU is initially placed in an inactivated state; and
    send processing instructions to the CPU for execution.

11. The at least one machine-readable medium of claim 10, wherein the operations further cause the processor to determine computational requirements of edge control nodes in an industrial control system including the edge control node, and wherein the CPU is activated based on a determination by the orchestration server that activating the CPU satisfies a control strategy for the industrial control system.

12. The at least one machine-readable medium of claim 10, wherein the operations further cause the processor to receive an indication to activate the CPU of the edge control node in the industrial control system.

13. The at least one machine-readable medium of claim 10, wherein the authenticated activation code is authenticated by the MCU before the CPU is activated.

14. The at least one machine-readable medium of claim 10, wherein the operations further cause the processor to send a deactivation code, from the orchestration server, to the CPU to deactivate the CPU.

15. The at least one machine-readable medium of claim 10, wherein the edge control node is a node in a ring topology network with a bridge device connecting the network to the orchestration server.

16. An industrial control system comprising:
    a ring network including a plurality of edge control nodes;
    an orchestration server;
    a bridge connecting the orchestration server to the ring network; and
    wherein the plurality of edge control nodes includes a first edge control node comprising:
        a system on a chip including:
            a microcontroller (MCU) to convert input/output (IO) data from an IO subsystem and send the converted data via a networking component to the orchestration server via the bridge; and
            a processor in an initial inactive state to:
                receive an activation signal from the orchestration server; and
                change to an activated state in response to receiving the activation signal.

17. The industrial control system of claim 16, wherein the processor is further configured to receive a deactivation signal from the orchestration server after a period of time in the activated state, and in response, return to the inactive state.

18. The industrial control system of claim 16, wherein the processor is activated based on a determination by the orchestration server that activating the processor satisfies a control strategy for the industrial control system.

19. The industrial control system of claim 16, wherein the activation signal is received at the processor directly from the MCU.

20. The industrial control system of claim 16, wherein the plurality of edge control nodes includes a second edge node with a second processor remaining in an inactive state after the processor of the first edge control node is activated.

21. The industrial control system of claim 16, wherein the orchestration server is further configured to send processing instructions to the processor for execution.

22. The industrial control system of claim 16, wherein the processor is a central processing unit (CPU).

* * * * *